(12) United States Patent
White et al.

(10) Patent No.: US 11,994,975 B2
(45) Date of Patent: May 28, 2024

(54) METHOD AND SYSTEM FOR PERFORMING ROOT CAUSE ANALYSIS ASSOCIATED WITH SERVICE IMPAIRMENTS IN A DISTRIBUTED MULTI-TIERED COMPUTING ENVIRONMENT

(71) Applicant: Dell Products L.P., Round Rock, TX (US)

(72) Inventors: William Jeffery White, Plano, TX (US); Said Tabet, Austin, TX (US); Robert Anthony Lincourt, Jr., Franklin, MA (US)

(73) Assignee: Dell Products L.P., Round Rock, TX (US)

( * ) Notice: Subject to any disclaimer, the term of this patent is extended or adjusted under 35 U.S.C. 154(b) by 119 days.

(21) Appl. No.: 17/722,093

(22) Filed: Apr. 15, 2022

(65) Prior Publication Data

US 2023/0333967 A1    Oct. 19, 2023

(51) Int. Cl.
*G06F 11/36* (2006.01)

(52) U.S. Cl.
CPC .................................. *G06F 11/366* (2013.01)

(58) Field of Classification Search
CPC ........................... G06F 11/366; G06F 11/0793
USPC .................................................. 714/38.1, 25
See application file for complete search history.

(56) References Cited

U.S. PATENT DOCUMENTS

| | | | |
|---|---|---|---|
| 11,030,068 B1 * | 6/2021 | Agarwal | G06F 11/327 |
| 11,269,718 B1 | 3/2022 | Chen et al. | |
| 11,595,243 B1 | 2/2023 | Schreiber et al. | |
| 2020/0379837 A1 | 12/2020 | Krishnaswamy et al. | |
| 2021/0141900 A1 * | 5/2021 | Brown | G06F 21/57 |

(Continued)

FOREIGN PATENT DOCUMENTS

| | | | |
|---|---|---|---|
| CN | 113961412 A | * | 1/2022 |
| CN | 115348159 A | * | 11/2022 |

OTHER PUBLICATIONS

Causal Inference Techniques for Microservice Performance Diagnosis: Evaluation and Guiding Recommendations, Li Wu, Johan Tordsson, Erik Elmroth, Odej Kao Elastisys AB, Umeå, Sweden, Email: {li.wu, johan.tordsson, Distributed and Operating Systems Group, TU Berlin, Berlin, Germany, Department of Computing Science, Umeå University, Umeå, Sweden, Sep. 29, 2021.

(Continued)

*Primary Examiner* — Chae M Ko
(74) *Attorney, Agent, or Firm* — Chamberlain, Hrdlicka, White, Williams, & Aughtry; Aly Z. Dossa

(57) ABSTRACT

Techniques described herein relate to a method for managing a distributed multi-tiered computing (DMC) environment. The method includes obtaining, by a local controller associated with a DMC domain, a set of correlated services associated with an anomaly; obtaining a service dependency graph associated with the set of correlated services; generating a causal variance for each service using the correlated services and the service dependency graph; generating a weighted rank order of causal services based on the causal variance associated with each service, and the weighted rank order of causal services includes a portion of the services associated with an application associated with the anomaly; and performing remediation based on the weighted rank order of the causal services.

14 Claims, 11 Drawing Sheets

(56) References Cited

U.S. PATENT DOCUMENTS

| | | | |
|---|---|---|---|
| 2021/0397500 A1* | 12/2021 | Wieder | ............ G06F 11/079 |
| 2022/0247618 A1 | 8/2022 | Côté et al. | |
| 2022/0382614 A1 | 12/2022 | Chen et al. | |
| 2023/0026283 A1 | 1/2023 | Xu et al. | |

OTHER PUBLICATIONS

Causation Entropy From Symbolic Representations of Dynamical Systems Carlo Cafaro, Warren M. Lord, Jie Sun, and Erik M. Bollt Department of Mathematics, Clarkson University, 8 Clarkson Ave, Potsdam, NY, 13699-5815, USA, arXiv:1507.07262v1 [physics.data-an] Jul. 11, 2015.

Debeer and Strobl BMC Bioinformatics. Conditional Permutation Importance Revisited. (2020) 21:307 https://doi.org/10.1186/s12859-020-03622-2.

DirectLiNGAM: A Direct Method for Learning a Linear Non-Gaussian Structural Equation Model, Shohei Shimizu, Takanori Inazumi, Yasuhiro Sogawa, Aapo Hyvärinen, Yoshinobu Kawahara, Takashi Washio, Patrik O. Hoyer, Kenneth Bollen, Journal of Machine Learning Research 12 (2011) 1225-1248.

FIRM: An Intelligent Fine-grained Resource Management Framework for SLO-Oriented Microservices Haoran Qiu, Subho S. Banerjee, Saurabh Jha, Zbigniew T. Kalbarczyk, and Ravishankar K. Iyer, University of Illinois at Urbana-Champaign., This paper is included in the Proceedings of the 14th USENIX Symposium on Operating Systems Design and Implementation Nov. 4-6, 2020 978-1-939133-19-9.

Haoran Qiu, Subho S. Banerjee, Saurabh Jha, Zbigniew T. Kalbarczyk, and Ravishankar K. Iyer, University of Illinois at Urbana-Champaign. FIRM: An Intelligent Fine-grained Resource Management Framework for SLO-Oriented Microservices. Corpus ID 978-1-939133-19-9, 2020 14th Usenix Symposium on Operating Systems Design and Implementation.

Huang, Huang, Chen, Wang, IEEE: Simulated Annealing for Sequential Pattern Detection and Seismic Applications, Dec. 2014 doi.org/10.1109/JSTARS.2014.2344756.

Li Wu, Jasmin Bogatinovski, Sasho Nedelkoski, Johan Tordsson, Odej Kao. Performance Diagnosis in Cloud Microservices using Deep Learning. AIOPS 2020—International Workshop Artificial Intelligence for IT Operations, Dec. 2020, Dubai, United Arab Emirates. hal-02948735.

Lin, Li, Liao, Franke, Capacity Optimization for Resource Pooling in Virtualized Data Centers with Composable Systems, DOI 10.1109/TPDS.2017.2757479 (2017).

Muhammad Tirmazi, Adam Barker, Nan Deng, Md E. Haque, Zhi-jing Gene Qin, Steven Hand, MorHarchol-Balter, and John Wilkes. 2020. Borg: the Next Generation. In Fifteenth European Conference on Computer Systems (EuroSys '20), Apr. 27-30, 2020, Heraklion, Greece. ACM, New York, NY, USA, 14 pages. https://doi.org/10.1145/3342195.3387517.

Stoica, INRA-Biometrie, Gregori, University Jaume I, Mateu, University Jaume I: Simulated Annealing and Object Point Processes: Tools for Analysis of Spatial Patterns, Jul. 2005.

Yihui Feng, Alibaba Group; Zhi Liu, Yunjian Zhao, Tatiana Jin, and Yidi Wu, The Chinese University of Hong Kong; Yang Zhang, Alibaba Group; James Cheng, The Chinese University of Hong Kong; Chao Li and Tao Guan, Alibaba Group. Scaling Large Production Clusters with Partitioned Synchronization. Corpus ID 235344400. 2021 Usenix Annual Technical Conference.

\* cited by examiner

METHOD AND SYSTEM FOR PERFORMING ROOT CAUSE ANALYSIS ASSOCIATED WITH SERVICE IMPAIRMENTS IN A DISTRIBUTED MULTI-TIERED COMPUTING ENVIRONMENT

BACKGROUND

Computing devices often exist in complex ecosystems of devices in which data exists and/or is generated. Such data may be used and/or operated on to produce any number of results. Such operations are often performed by applications that include any number of services. It may be advantageous to provision all or portions of such applications within certain portions of the ecosystem of devices. However, as the complexity of such an ecosystem increases (e.g., more data, more devices, etc.), it may become important to identify anomalous behavior and address application impairments. Addressing application impairments may be caused by specific portions of the application. It may become important to identify the causes of application impairments in order to resolve the application impairments.

SUMMARY

In general, certain embodiments described herein relate to a method for managing a distributed multi-tiered computing (DMC) environment. The method may include obtaining, by a local controller associated with a DMC domain, a set of correlated services associated with an anomaly; obtaining a service dependency graph associated with the set of correlated services; generating a causal variance for each service using the correlated services and the service dependency graph; generating a weighted rank order of causal services based on the causal variance associated with each service, and the weighted rank order of causal services includes a portion of the services associated with an application associated with the anomaly; and performing remediation based on the weighted rank order of the causal services.

In general, certain embodiments described herein relate to a non-transitory computer readable medium that includes computer readable program code, which when executed by a computer processor enables the computer processor to perform a method for managing a distributed multi-tiered computing (DMC) environment. The method may include obtaining, by a local controller associated with a DMC domain, a set of correlated services associated with an anomaly; obtaining a service dependency graph associated with the set of correlated services; generating a causal variance for each service using the correlated services and the service dependency graph; generating a weighted rank order of causal services based on the causal variance associated with each service, and the weighted rank order of causal services includes a portion of the services associated with an application associated with the anomaly; and performing remediation based on the weighted rank order of the causal services.

In general, certain embodiments described herein relate to a system for managing a distributed multi-tiered computing (DMC) environment. The system may include a DMC environment. The system may also include a local controller associated with a DMC domain of the DMC environment, which includes a processor and memory, and includes the functionality to obtain a set of correlated services associated with an anomaly; obtain a service dependency graph associated with the set of correlated services; generate a causal variance for each service using the correlated services and the service dependency graph; generate a weighted rank order of causal services based on the causal variance associated with each service, and the weighted rank order of causal services includes a portion of the services associated with an application associated with the anomaly; and perform remediation based on the weighted rank order of the causal services.

Other aspects of the embodiments disclosed herein will be apparent from the following description and the appended claims.

BRIEF DESCRIPTION OF DRAWINGS

Certain embodiments disclosed herein will be described with reference to the accompanying drawings. However, the accompanying drawings illustrate only certain aspects or implementations of the embodiments disclosed herein by way of example and are not meant to limit the scope of the claims.

DETAILED DESCRIPTION

Figure 1A:
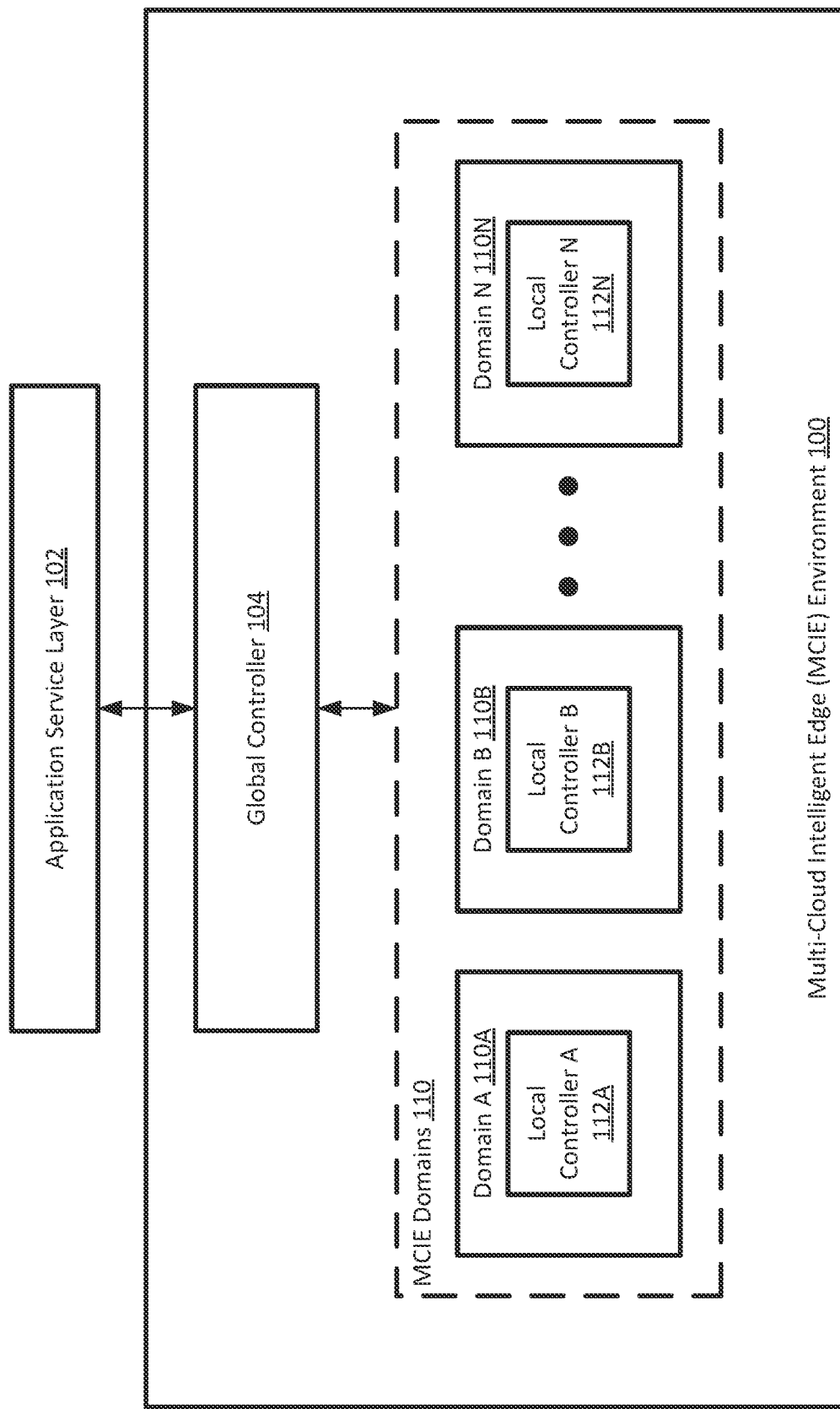
FIG. 1A shows a diagram of a system in accordance with one or more embodiments disclosed herein.

Specific embodiments will now be described with reference to the accompanying figures. In the following description, numerous details are set forth as examples of embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

As used herein, an entity that is programmed to and/or configured to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In general, embodiments described herein relate to methods, systems, and non-transitory computer readable mediums storing instructions for performing root cause analysis associated with service impairments in a distributed multi-tiered environment.

In one or more embodiments, as computing environments grow in size and complexity (e.g., from multi-cloud to multi-core to multi-edge domains of a distributed multi-tiered computing environment), connecting more diverse devices generating more data, the need to be able to efficiently provision applications in such environments is required in order to support complex workflows. In one or more embodiments, as the overall application workflow extends within an environment to capture, process, analyze, or otherwise use data, fitting the services of the application workflow to the capabilities and capacities of the various portions of the distributed multi-tiered computing environment is required. Such fitting may allow for meeting the service level agreement (SLA) and/or service level objectives (SLOs) for the application workflow and the services used in building the workflow, which may be achieved by provisioning work to portions of the distributed mule-tiered computing environment having necessary capabilities, capacity, and/or data. In one or more embodiments, such a complex distributed multi-tiered computing environment may also be required to service large quantities of requests to provision applications.

Based on the large quantity and a high frequency of application provisioning requests and the large quantity and increased complexity of the domains included in the distributed multi-tiered computing environment, the distributed multi-tiered computing environment may include a management hierarchy. In one or more embodiments, the management hierarchy includes global level management, domain level management, and device level management. In one or more embodiments, global level management services may be performed by a global controller, domain level management services may be performed by local controllers associated with the domains of the distributed multi-tiered computing environment, and the device level management services may be performed by endpoint controllers associated with devices included in the domains of the distributed multi-tiered computing environments. In one or more embodiments, instructions and/or data may be passed between the global controller, local controllers, and the endpoint controllers to perform the global level management services, domain level management services, and the device level management services, respectively. As a result, by dispersing the management functionality of the distributed multi-tiered computing environment into three levels (i.e., global level, domain level, and device level), the efficiency, performance, and scalability of the distributed multi-tiered computing environment may be improved.

In one or more embodiments, as part of local level management services, local controllers may monitor application SLO metrics and detect and/or predict anomalies associated with performance of applications within MCIE domains. In one or more embodiments, in response to identifying anomalies, the local controllers may identify correlated, and then causal services associated with the anomalies during the performance of root cause analysis. Additionally, the local controllers may perform remediation of service impairments and anomalies using the correlated services. Accordingly, the negative effects of service failure in the distributed multi-tiered computing environment may be mitigated and the performance of applications may be improved.

FIG. 1A shows a diagram of a system in accordance with one or more embodiments described herein. The system may include an application service layer (102) and a distributed multi-tiered computing environment. The distributed multi-tiered computing environment may be referred to as a multi-cloud intelligent edge (MCIE) environment (100) throughout this Detailed Disclosure. The MCIE environment (100) may include a global controller (104) and MCIE domains (110). The MCIE domains (110) may include any quantity of MCIE domains (110) without departing from embodiments disclosed herein. For example, the MCIE domains (110) may include domain A (110A), domain B (110B) and domain N (110N). Each domain may include (or be operatively connected to) a local controller. For example, domain A (110A) may include (or be operatively connected to) local controller A (112A), domain B (110B) may include (or be operatively connected to) local controller B (112B), and domain N (110N) may include (or be operatively connected to) local controller N (112N). All or any portion of any device or set of devices in the system illustrated in FIG. 1A may be operatively connected to any other device or set of devices via any combinations of wireless (e.g., WAN) and/or wired connections (e.g., Ethernet) referred to as a one or more networks. Each of these components is described below.

In one or more embodiments disclosed herein, the application service layer (102) includes the functionality to provide requests and manifests for provisioning applications in the MCIE environment (100). The application service layer (102) may be used by one or more users (e.g., customers of the MCIE environment (100), system administrators of the MCIE environment (100), etc.) to submit requests and manifests to the global controller (104) to provision applications in the MCIE environment (100). The application service layer (102) may also include the functionality to enable users to generate, configure, and/or modify requests and/or manifests through, for example, a graphical user interface. The application service layer (102) may include other and/or additional types of user interfaces without departing from embodiments disclosed herein.

The application service layer (102) may further include the functionality to provide and/or obtain additional information to and from the global controller (104). The additional information may include, for example, binary program files for applications, configuration files, communication information (e.g., user identifiers, network addresses, URLs, etc.), security information (e.g., encryption keys, digital signatures, certificates, etc.), and other and/or additional information that may be used by the global controller (104) to provision applications and/or establish communications between users and the global controller (104) without departing from embodiments disclosed herein. The application service layer (102) may include other and/or additional functionalities without departing from embodiments disclosed herein.

In one or more embodiments disclosed herein, the application service layer (102) is implemented using one or more computing devices. For additional details regarding computing devices, refer to FIG. 2 and FIG. 10.

In one or more embodiments disclosed herein, the application service layer (102) is implemented as a logical device. A logical device may utilize the computing resources of any number of computing devices and thereby provide the functionality of the application service layer (102) described throughout this application.

In one or more embodiments disclosed herein, the global controller (104) includes the functionality to perform global level management services for the MCIE environment (100). The global level management services may include global scheduling services. The global scheduling services may include: (i) obtaining requests and manifests from users of the application service layer (102), (ii) performing global provisioning of applications to one or more domains (e.g., 110A, 110B) of the MCIE environment (100), (iii) providing and/or obtaining information to/from local controllers (e.g., 112A, 112B) of MCIE domains (e.g., 110A, 110B), and (iv) providing and/or obtaining information to/from users of the application service layer (102).

The global scheduling services may further include scheduling policy selection services. In one or more embodiments disclosed herein, the scheduling policies are one or more data structures that include scheduling requirements, objectives, and/or criteria that may be used by local controllers to perform domain level scheduling. Additionally, the global controller (104) may further include the functionality to assign priorities to each scheduling policy selected in a scheduling package.

In one or more embodiments disclosed herein, the scheduling policies include one or more data structures that include scheduling requirements to be used by local controllers to perform domain level scheduling services. The requirements may include makespan minimization, scheduling efficiency, resource utilization, and resource cost. The scheduling policies may include other and/or additional scheduling requirements without departing from embodiments disclosed herein.

In one or more embodiments disclosed herein, makespan minimization refers to minimizing the time that it takes to perform a domain level scheduling job. In other words, makespan minimization refers to minimizing the time that an application responds to a request as measured from the first service in the execution path to the last service.

In one or more embodiments disclosed herein, scheduling efficiency refers to minimizing the time between obtaining an application provisioning request and completing the scheduling of the application associated with the provisioning request.

In one or more embodiments disclosed herein, resource utilization may refer to maximizing resource utilization when scheduling application tasks to resources (e.g., compute resources, domain specific accelerator resources, memory resources, networking resources, storage resources, etc.) of domains.

In one or more embodiments disclosed herein, resource cost may refer to minimizing the resource cost of provisioning applications to target domains and/or devices. In other words, application tasks may be assigned to resources that computationally cost less than other resources of the domains, thereby indirectly resulting in a reduction of monetary cost to the user.

Returning to the discussion of the global scheduling services, the global scheduling services may further include generating scheduling packages using case based reasoning. Case based reasoning may include obtaining fingerprints of previously provisioned applications, or portions thereof, and identifying target domains for applications, or portions thereof, based on the fingerprints. A fingerprint may include an aggregation of scheduling information and performance metrics associated with a previously provisioned application or service. The global controller (104) may analyze the fingerprints to: (i) identify previous target domains and/or scheduling packages associated with fingerprints of previously provisioned applications or services for use in assigning new applications associated with the fingerprints, and/or (ii) determine whether any additional criteria should be used when identifying target domains or generating scheduling packages for new applications associated with fingerprints. For additional information regarding provisioning applications using case based reasoning, refer to FIG. 5.

In one or more embodiments disclosed herein, in addition to the global scheduling services, the global level management services also includes global lifecycle services.

In one or more embodiments disclosed herein, the global controller (104) may further include the functionality to perform load management services of the global lifecycle services. The load management services may include generating load management predictions that specify short term, medium term, and long term future loads of the global controller (104), the MCIE domains (110), the local controllers (e.g., 112A, 112B, 112N), and the devices of the MCIE domains (110). The global controller (104) may initiate adjustment of future scheduling policies for the global controller (104) and local controllers (e.g., 112A, 112B, 112N) based on the load management predictions. The global controller (104) may also adjust the number of local scheduler instances of local controllers (e.g., 112A, 112B, 112N) and the infrastructure capacity of MCIE domains (110) of the MCIE environment (100). For additional information regarding the performance of load management services, refer to FIG. 4.

In one or more embodiments disclosed herein, the lifecycle management services further include global resource buffer management services. The global resource buffer management services may include generating updated resource buffers for different types of devices and/or MCIE domains (110). The global controller (104) may include the functionality to periodically generate resource buffers for MCIE domains (110) using device capacity information, device configuration information, and a power law resource buffer generation algorithm. The global controller (104) may use other and/or additional algorithms to generate resource buffers without departing from embodiments disclosed herein. The global controller (104) may provide updated resource buffers to local controllers (e.g., 112A, 112B, 112N) of MCIE domains (110).

The global controller (104) may include other and/or additional functionalities without departing from embodiments disclosed herein.

In one or more embodiments disclosed herein, the global controller (104) is implemented using one or more computing devices. For additional details regarding computing devices, refer to FIG. 2 and FIG. 10.

In one or more embodiments disclosed herein, the global controller (104) is implemented as a logical device. A logical device may utilize the computing resources of any number of computing devices and thereby provide the functionality of the global controller (104) described throughout this application.

In one or more embodiments disclosed herein, the MCIE domains (110) include the functionality to execute all and/or portions of applications. The execution of the application may provide computer implemented services for users of the system. The computer implemented services may include any combination of inferencing, data analytics, computer vision, database management, etc. The computer implemented services may include other and/or additional types of computer implemented services without departing from embodiments disclosed herein.

An application may include one or more services (also referred to throughout this Detailed Disclosure as tasks or application tasks). Each service may provide a portion of the functionality of the application. The services may include, for example, data collection services, data transformation services, data processing services, monitoring services, etc. The services may include other and/or additional types of services without departing from embodiments disclosed herein. An application may include any quantity of service instances associated with each service of the application without departing from embodiments disclosed herein.

In one or more embodiments disclosed herein, each MCIE domain (e.g., 110A, 110B, 110N) of the MCIE domains (110) is implemented as one or more computing devices. For additional details regarding computing devices, refer to FIG. 2 and FIG. 10. For additional information regarding MCIE domains (110), refer to FIG. 2.

In one or more embodiments disclosed herein, the MCIE domains (110) are implemented as logical devices. A logical device may utilize the computing resources of any number of computing devices and thereby provide the functionality of the MCIE domains (110) described throughout this application. For additional information regarding MCIE domains (110), refer to FIG. 2.

In one or more embodiments disclosed herein, the local controllers (e.g., 112A, 112B, 112N) include the functionality to perform domain level management services. The domain level scheduling services may include: (i) obtaining scheduling packages and scheduling requests from the global controller (104), (ii) assigning services (or tasks) of applications to devices included in domain associated with the local controller, (iii) providing application access information (discussed below) to the global controller (104), and (iv) providing domain information (discussed below) to the global controller (104). The local controllers (e.g., 112A, 112B, 112N) may include other and/or additional functionalities without departing from the embodiments disclosed herein. For additional information regarding local controllers (e.g., 112A, 112B, 112N), refer to FIG. 1B.

In one or more embodiments disclosed herein, the local controllers (e.g., 112A, 112B, 112N) are implemented as one or more computing devices. For additional details regarding computing devices, refer to FIG. 2 and FIG. 10.

In one or more embodiments disclosed herein, the local controllers (e.g., 112A, 112B, 112N) are implemented as logical devices. A logical device may utilize the computing resources of any number of computing devices and thereby provide the functionality of the local controllers (e.g., 112A, 112B, 112N) described throughout this application.

While FIG. 1A shows a configuration of certain components, other configurations and/or other components may be used without departing from the scope of embodiments described herein. Accordingly, embodiments disclosed herein should not be limited to the configuration of components shown in FIG. 1A.

Figure 1B:
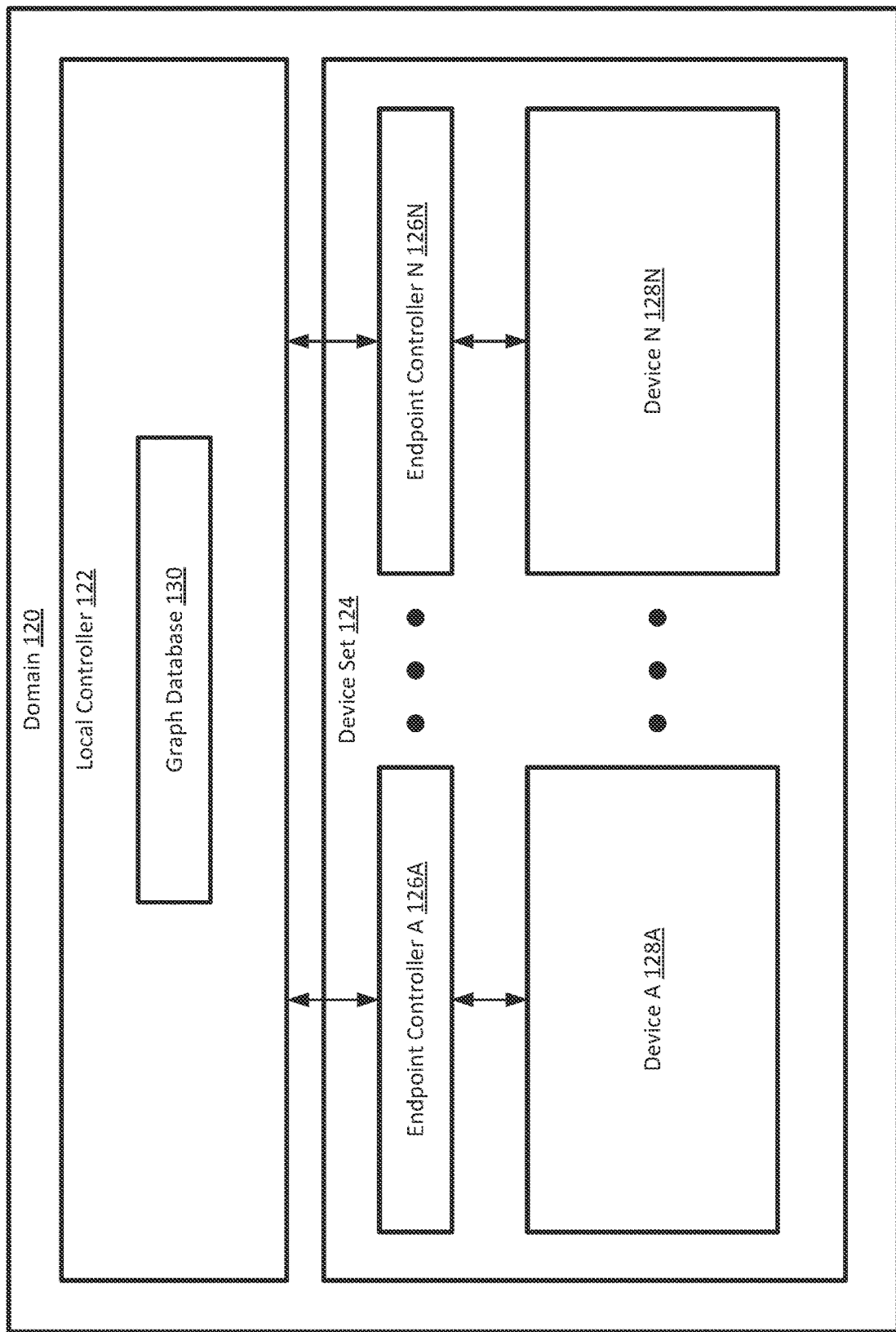
FIG. 1B shows a diagram of a domain in accordance with one or more embodiments disclosed herein.

FIG. 1B shows a diagram of a domain in accordance with one or more embodiments disclosed herein. The domain (120) may be an embodiment of the MCIE domains (110) (e.g., domain A (110A), domain B (110B), and domain N (110N)) discussed above with regard to FIG. 1A. As discussed above, the domain (120) may include the functionality to execute all and/or portions of applications. To provide the aforementioned functionality, the domain (120) includes a local controller (122) and a device set (124). Each of the aforementioned components is discussed below.

The local controller (122) may be an embodiment of the local controllers (e.g., 112A, 112B, 112N) discussed above with regard to FIG. 1A. As discussed above, the local controller (122) may include the functionality to perform domain level scheduling services for the domain (120). The local controller may further include the functionality to perform domain level scheduling services using constraint management scheduling, heuristic scheduling, and/or reinforcement learning scheduling. Moreover, as part of performing the domain level scheduling services, the local controller (122) may use and/or maintain a graph database (130).

In one or more embodiments disclosed herein, the graph database (130) is implemented as one or more data structures that include domain information. The domain information may specify devices included in the device set (124) of the domain (120) (e.g., include device identifiers associated with the devices). The domain information may further specify the capability and the capacity of the devices of the device set (124). The domain information may include resource units associated with each device in the device set that specify the capability of the corresponding device. The resource units may include compute units (e.g., quantity of processors and/or processor cores), memory units (e.g., size of total memory capacity), network units (e.g., quantity network interface cards (NICs), and/or total network bandwidth), and accelerator units (e.g., quantity of graphics processing units (GPUs) and/or quantity of GPU memory, field programmable gate arrays (FPGAs) and/or quantity of FPGA logic elements, etc.) associated with each device of the device set (124). The resource units may include other and/or additional information regarding the capability (e.g., storage units associated with a total quantity of data storage capacity) of the devices in the device set (124) without departing from embodiments disclosed herein.

In one or more embodiments disclosed herein, the resource units may be normalized using a reference device. For example, the reference device may include 100 CPU cores, 32 gigabytes of memory for RAM, 40 gigabytes of memory for a GPU, and 10 gigabytes per second of network bandwidth. A device (e.g., 128A) of the device set (124) for the domain (120) may include 48 CPU cores, 16 gigabytes of memory for RAM, two 40 gigabyte GPUs, and two 10 gigabytes per second NICs. The normalized resource units associated with the device would include 0.48 normalized compute units, 0.5 normalized memory units, 2.0 normalized accelerator units, and 2.0 normalized network units.

In one or more embodiments disclosed herein, the resource units, or a portion thereof, may also be normalized based on relative performance. For example, a first processor may be an older generation compared to a second processor, and therefore may only be able to perform 80 percent of the cycles per second compared to that of the second processor. If a first device includes 100 cores of the first processor and a second device include 100 cores of the second processor, then the first device may include 0.8 normalized compute units and the second device may include 1.0 normalized compute units assuming that the processor included in the reference system includes the same performance as that of the second device.

Continuing with the discussion of the domain information, the domain information may further specify portions of the normalized resource units (e.g., percentages of the normalized resource units) associated with the device that are available for provisioning and that are provisioned to execute existing application and/or services. The domain information may further specify the applications, or portions thereof, (e.g., services) that are executing on each device included in the device set (124) (e.g., include application identifiers and/or service identifiers associated with each device). The domain information may be generated and/or obtained by the local controller (122). The local controller (122) may include the domain information in the graph database (130). The local controller (122) may update the graph database over time. The graph database (130) may include other and/or additional information associated with the domain (120) without departing from embodiments disclosed herein.

The graph database (130) may be stored in storage of the local controller (122). The storage may be implemented using physical devices that provide data storage services (e.g., storing data and providing copies of previously stored data). The devices that provide data storage services may include hardware devices and/or logical devices. For example, the storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

The storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

While discussed above as being stored in storage of the local controller (122), the graph database may be stored in one or more storages of the domain (120) (e.g., storages included in the device set (124)), and/or stored in a distributed or otherwise shared storage accessible by the global controller (104, FIG. 1A) and local controllers (e.g., 112A, 112B, 112N, FIG. 1A) using any appropriate method of distributed data storage (e.g., network file system, peer-to-peer storage network, etc.) without departing from embodiments disclosed herein.

In one or more embodiments disclosed herein, in addition to the domain scheduling services, the domain level management services also includes domain lifecycle services.

In one or more embodiments disclosed herein, the local controller (122) includes the functionality to perform the domain lifecycle services. The domain lifecycle services may include performing anomaly detection, performing service impairment root cause analysis, and performing service impairment remediation. For additional information regarding performing anomaly detection, service impairment root cause analysis, and service impairment remediation, refer to FIGS. 7-9 respectively.

The local controller (122) may include other and/or additional functionalities without departing from embodiments disclosed herein.

In one or more embodiments disclosed herein, the device set (124) includes one or more endpoint controllers and one or more devices. For example, the device may include endpoint controller A (126A), endpoint controller N (126N), device A (128A), and device N (128N). Each device (e.g., 128A) may include and/or otherwise be operatively connected to an endpoint controller (e.g., 126A).

In one or more embodiments disclosed herein, an endpoint controller includes the functionality to perform device level management services for a corresponding device. For example, endpoint controller A (126A) may perform device level management services for device A (128A) and endpoint controller N (126N) may perform device level management services for device N (128N).

In one or more embodiments disclosed herein, the device level management services include device level scheduling services. The device level scheduling services may include: (i) obtaining provisioning commands and scheduling assignments from the local controller (122), (ii) performing the provisioning commands and using the scheduling assignments to instantiate applications and/or services on the corresponding device, (iii) setting up monitoring services associated with the device, and (iv) sending configuration confirmations and monitoring information to the local controller (122). The device level scheduling services may include other and/or additional services without departing from embodiments disclosed herein. For additional information regarding device level scheduling services, refer to FIG. 10.

In one or more embodiments disclosed herein, the device level management services further includes device lifecycle services. The device lifecycle services may include resource buffer management services. The resource buffer management services may include (i) obtaining resource buffers from the local controller (122), (ii) maintaining resource buffers associated with the device, monitoring device metrics to determine whether the resource buffer should be adjusted, (iii) updating resource buffers based on newly obtained resource buffers and/or the device metrics. The resource buffer management services may include other and/or additional services without departing from embodiments disclosed herein.

The endpoint controllers (e.g., 126A, 126N) may include other and/or additional functionalities without departing from embodiments disclosed herein.

In one or more embodiments disclosed herein, the endpoint controllers (e.g., 126A, 126N) are implemented as one or more computing devices. A computing device may be an embodiment of the computing devices discussed above and with respect to FIG. 10.

In one or more embodiments disclosed herein, the endpoint controllers (e.g., 126A, 126N) are implemented as logical devices. A logical device may utilize the computing resources of any number of computing devices and thereby provide the functionality of the endpoint controllers (e.g., 126A, 126N) described throughout this application.

In one or more embodiments disclosed herein, the endpoint controllers (e.g., 126A, 126N) are implemented as physical devices of the device set. A physical device may include circuitry. The physical device may be, for example, a field-programmable gate array, application specific integrated circuit, programmable processor, microcontroller, digital signal processor, or other hardware processor. The physical device may be configured to provide the functionality of the endpoint controllers (e.g., 126A, 126N) described throughout this Detailed Description.

In one or more embodiments disclosed herein, the endpoint controllers (e.g., 126A, 126N) are implemented as computer instructions, e.g., computer code, stored on a persistent storage that when executed by a processor of the device set (124) causes the device set (124) to provide the functionality of the endpoint controllers (e.g., 126A, 126N) described throughout this Detailed Description.

In one or more embodiments disclosed herein, the devices (e.g., 128A, 128N) include the functionality to execute applications and/or services to provide the aforementioned functionality of the domain (120) (e.g., to provide computer implemented services to users). The devices (e.g., 128A, 128N) may include other and/or additional functionalities without departing from embodiments disclosed herein.

In one or more embodiments disclosed herein, a device (e.g., 128A) is implemented as a computing device. In one or more embodiments, a computing device is any device, portion of a device, or any set of devices capable of electronically processing instructions and may include any number of components, which include, but are not limited to, any of the following: one or more processors (e.g., components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors for obtaining data, and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyperconverged infrastructure, a cluster, a virtual machine, a logical container (e.g., for one or more applications), and/or any other type of device with the aforementioned requirements.

In one or more embodiments, any or all of the aforementioned examples may be combined to create a system of such devices (e.g., the device set (124)). Other types of computing devices may be used without departing from the scope of the embodiments described herein.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium. As discussed above, embodiments disclosed herein may be implemented using computing devices.

In one or more embodiments, such computing devices may be operatively connected to other computing devices of the device set (124) in any way, thereby creating any topology of computing devices within the device set (124). In one or more embodiments, one or more computing devices in the device set (124) may be operatively connected to any one or more devices in any other domain of the MCIE environment (100, FIG. 1A). Such operative connections may be all or part of a network as discussed above. A network may refer to an entire network or any portion thereof (e.g., a logical portion of the devices within a topology of devices). A network may include a data center network, a wide area network, a local area network, a wireless network, a cellular phone network, and/or any other suitable network that facilitates the exchange of information from one part of the network to another. A network may be located at a single physical location, or be distributed at any number of physical sites. In one or more embodiments, a network may be coupled with or overlap, at least in part, with the Internet.

The network may include any number of devices within any domain (e.g., 110A, 110B, 110N, FIG. 1A) of the MCIE environment (100), as well as devices external to, or between, such portions of MCIE environment (100). In one or more embodiments, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the scope of embodiments described herein. Examples of a network device include, but are not limited to, a network switch, a router, a multilayer switch, a fibre channel device, an InfiniBand® device, etc. A network device is not limited to the aforementioned specific examples.

In one or more embodiments, a network device includes functionality to receive network traffic data units (e.g., frames, packets, tunneling protocol frames, etc.) at any of the network interfaces (i.e., ports) of a network device and to process the network traffic data units. In one or more embodiments, processing a network traffic data unit includes, but is not limited to, a series of one or more lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Examples of network traffic data unit processing include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device. In one or more embodiments, network devices are configured to participate in one or more network protocols, which may include discovery schemes by which a given network device may obtain information about all or any of the network topology in which the network device exists. Such discovery schemes may include sharing of information between network devices, and may also include providing information to other devices within MCIE environment (100), such as, for example, the global controller and/or local controllers (discussed above).

In one or more embodiments, any or all of the devices in the device set (124) may form one or more virtualization environments (not shown). In one or more embodiments, a virtualization environment is any environment in which any number of computing devices are subject, at least in part, to a shared scheme pooling compute resources for use in deploying virtualized computing device instances (e.g., VMs, containers, emulators, etc.), which may be used in any arrangement to perform all or any portion of any work requested within a domain.

While only illustrated as including a limited number of components, the domain may include other and/or additional components without departing from embodiments disclosed herein.

Figure 2:
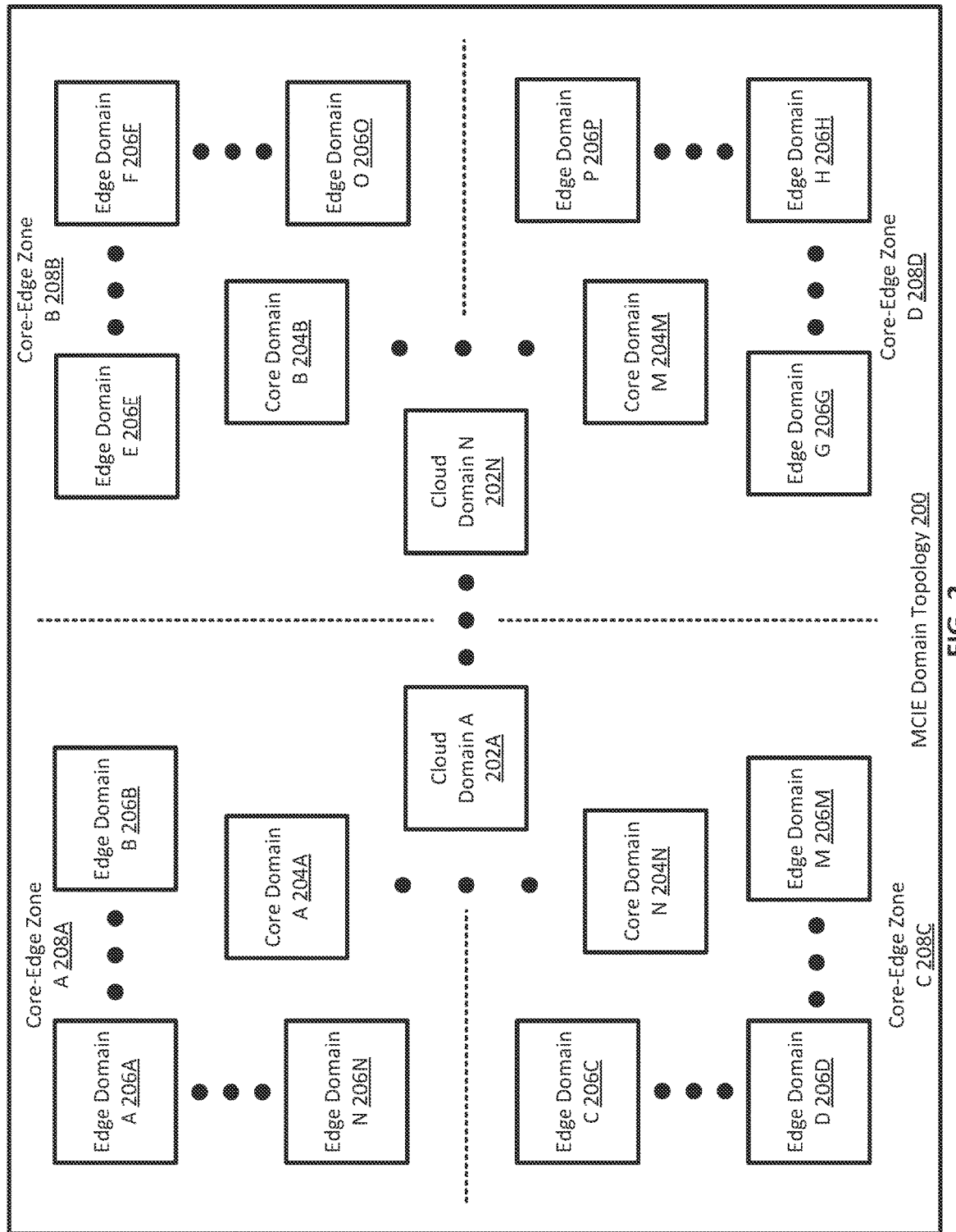
FIG. 2 shows a diagram of an MCIE domain topology in accordance with one or more embodiments disclosed herein.

FIG. 2 shows a diagram of a MCIE domain topology in accordance with one or more embodiments disclosed herein. As discussed above, the MCIE domains (110, FIG. 1A) may include any quantity of domains without departing from the embodiments disclosed herein. In one or more embodiments, MCIE domains (110, FIG. 1A) may be considered a hierarchy of domains. In the example embodiment shown in FIG. 2, the MCIE domain topology (200) includes edge domains, core domains, and cloud domains. The MCIE domain topology (200) may include cloud domains such as cloud domain A (202A), and cloud domain N (202N). The MCIE domain topology (200) may also include core domains such as core domain A (204A), core domain B (204B), core domain M (204M), and core domain N (204N). The MCIE domain topology (200) may further include edge domains such as edge domain A (206A), edge domain B (206B), edge domain C (206C), edge domain D (206D), edge domain E (206E), edge domain F (206F), edge domain G (206G), edge domain H (206H), edge domain M (206M), edge domain N (206N), edge domain O (206O), and edge domain P (206P).

The MCIE domain topology (200) is not limited to the exemplary arrangement shown in FIG. 2. The MCIE domain topology (200) may have any number of edge domains, which may be operatively connected to any number of core domains, which may, in turn, be operatively connected to one or more cloud domains. Additionally, a given MCIE domain topology (200) may have more or less layers without departing from the scope of embodiments described herein. For example, an edge domain may be operatively connected to a cloud domain without an intervening core domain. As another example, there may be only edge domains and core domains in the MCIE domain topology (200). One of ordinary skill in the art will recognize that there are many possible arrangements of the MCIE domain topology (200) other than the example topology shown in FIG. 2.

In one or more embodiments disclosed herein, each domain in the MCIE domain topology (200) includes a device set as discussed above in the description of the domain in FIG. 1B. In one or more embodiments, each device set is a set of computing devices, such as is discussed above in the description of device set A. However, the set of computing devices in different device sets may be different, and may be particular to the type of domain (e.g., edge, cloud, core) of the MCIE domain topology (200) that the device set is in. For example, an edge domain (e.g., 206A) of MCIE domain topology (200) may include sensors collecting data, controllers controlling the sensors, desktop devices, mobile computing devices, etc. Other domains may include different computing devices. For example, a core domain (e.g., 204A) of the MCIE domain topology (200) may include more powerful (e.g., having more compute resources) devices, a greater quantity of more powerful devices, specific architectures of sets of devices for performing certain tasks, etc. Also similarly, a cloud domain of the MCIE domain topology (200) may include still more and different devices configured and deployed in different ways than the other types of domains of the MCIE domain topology (200).

Additionally, the MCIE domain topology (200) may be arranged in a hierarchy. For example, a single cloud domain (e.g., 202A) may be operatively connected to any number of core domains (e.g., 204A), and each of which may be operatively connected to any number of edge domains (e.g., 206A, 206B, 206N). The particular device set in any given domain of the MCIE domain topology (200) may determine what capabilities the domain in which the device set exists is suited to perform, which is known to and/or determined by the local controllers for the domains (e.g., 112A, 112B, 112N, FIG. 1A).

Moreover, the MCIE domain topology (200) may be arranged based on geographical locations and/or geographical regions. In other words, a cloud domain (e.g., 202A) may include a device set that is associated with and/or physically spans a geographical region. A core domain (e.g., 204A) operatively connected to the cloud domain (e.g., 202A) may include a device set that is associated with and/or physically spans a portion of the geographical region associated with the cloud domain (e.g., 202A). An edge domain (e.g., 206A) operatively connected to the core domain (e.g., 204A) may include a device set that is associated with and/or physically spans a particular location within the portion of the geographical region associated with the core domain (e.g., 204A). As a simple example, a cloud domain (e.g., 202A) may be associated with the entirety of North America, a core domain (e.g., 204A) operatively connected to the cloud domain (e.g., 202A) may be associated with the United States of America, and an edge domain (e.g., 206A) may be associated with a warehouse located in New York City, New York.

Portions of the geographical regions associated with the cloud domains that include a core domain and one or more edge domains may be referred to as core-edge zones. The MCIE domain topology (200) may include core-edge zones such as core-edge zone A (208A), core-edge zone B (208B), core-edge zone C (208C), and core-edge zone D (208D). Core-edge zone A (208A) may include core domain A (204A), which may be operatively connected to edge domain A (206A), edge domain B (206B), and edge domain N (206N). Core-edge zone B (208B) may include core domain B (204B), which may be operatively connected to edge domain E (206E), edge domain F (206F), and edge domain O (2060). Core-edge zone C (208C) may include core domain N (204N), which may be operatively connected to edge domain C (206C), edge domain D (206D), and edge domain M (206M). Finally, core-edge zone D (208D) may include core domain M (204M), which may be operatively connected to edge domain G (206G), edge domain H (206H), and edge domain P (206P). The MCIE domain topology (200) may be arranged based on other and/or additional types of logical divisions (e.g., divisions within a company, types of devices included in device sets of domains, etc.) of domains without departing from embodiments disclosed herein.

While FIG. 2 shows a configuration of components, other configurations may be used without departing from the scope of embodiments described herein. Accordingly, embodiments disclosed herein should not be limited to the configuration of components shown in FIG. 2.

Figure 3:
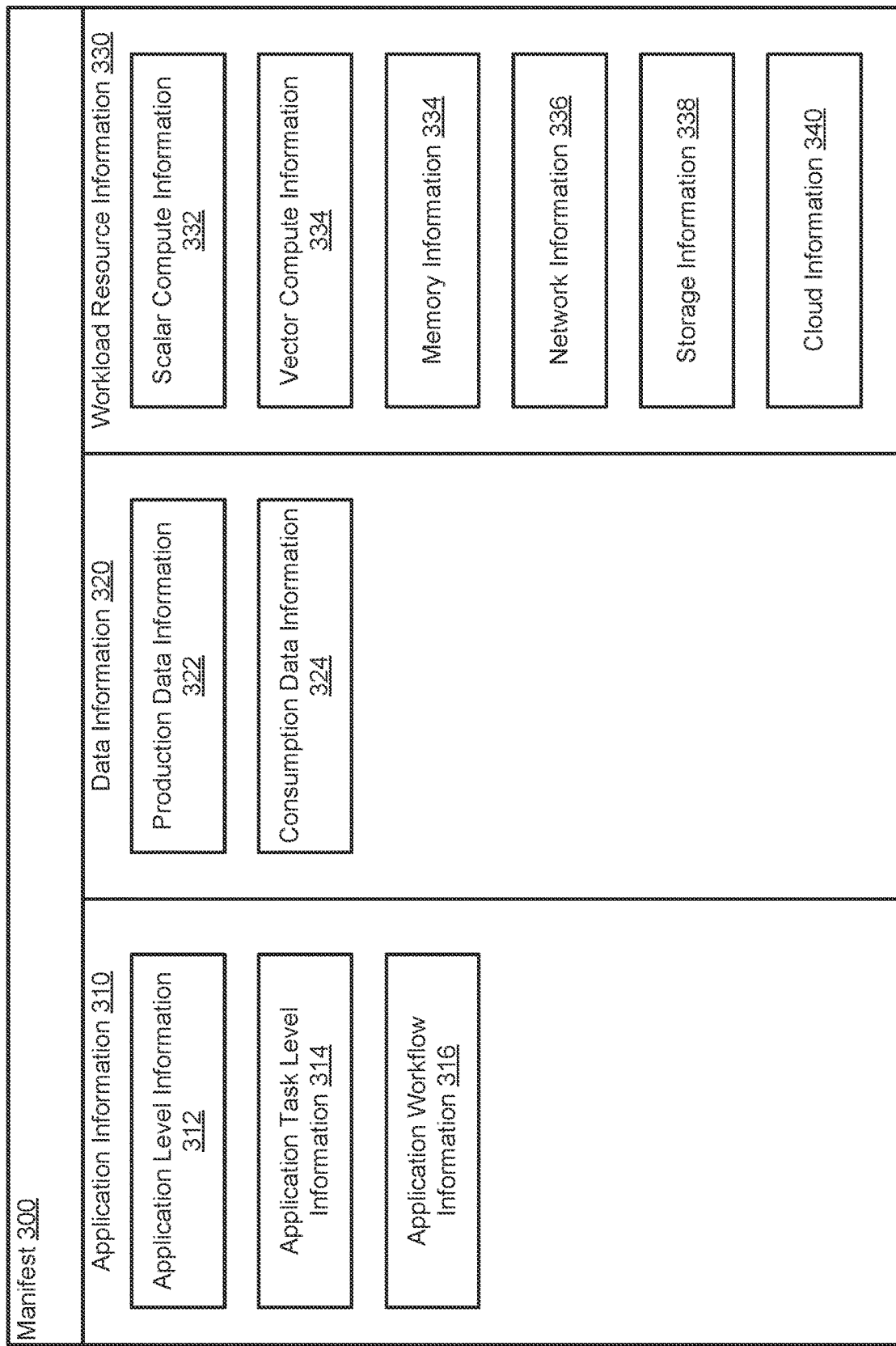
FIG. 3 shows a diagram of an example manifest in accordance with one or more embodiments disclosed herein.

FIG. 3 shows a diagram of a manifest in accordance with one or more embodiments disclosed herein. As discussed above, a user may submit a manifest (300) along with an application provisioning request using the application service layer (102, FIG. 1A) to the global controller (104, FIG. 1A) to provision an application in the MCIE environment (100, FIG. 1A). The manifest (300) may be configured and/or otherwise generated by the user by selecting, assigning, configuring, and/or including information associated with the application corresponding to the application provisioning request within the manifest (300).

The manifest (300) may be implemented as one or more data structures. The manifest (300) may be implemented as, for example, a YAML Ain't Markup Language (YAML) file. The manifest (300) may be used by the global controller (104, FIG. 1A) to perform global level scheduling services. The global controller (104, FIG. 1A) may include any portion of the information included in the manifest (300) in scheduling packages, which may be used by local controllers (e.g., 112A, 112B, 112N, FIG. 1A) to perform domain level scheduling services. The manifest (300) may include application information (310), data information (320), and workload resource information (330). The manifest (300) may include other and/or additional types of information that may be used to provision applications without departing from embodiments disclosed herein.

In one or more embodiments disclosed herein, the application information (310) includes application level information (312), application task level information (314), and application workflow information (316). The application information (310) may include other and/or additional information associated with the application to be provisioned without departing from embodiments disclosed herein.

The application level information (312) may include high level information associated with the application associated with the manifest. The high level information may include, for example, a request identifier associated with the application provisioning request corresponding to the manifest (300), a user identifier associated with the user that submitted the manifest (300), a cluster or application identifier associated with a previously provisioned application (e.g., for review, update, and delete requests), a request directive (e.g., a flag, tag, etc.) that specifies whether the application provisioning request is a create request, a review request, an update request, or a delete request, an runtime environment indicator and an application indicator (e.g., to indicate whether the manifest (300) is associated with an application and/or a runtime environment), and pre-emptible resource statuses.

The application level information (312) may also include target performance information associated with the application corresponding to the manifest (300). The performance information may include a target input latency associated with the manifest (300). The performance information may also include SLO metrics. The SLO metrics may include a target application response latency, a target application performance (e.g., percentage of successful completion of tasks), and a target application uptime. The application level information (312) may also include targeted domain information. The targeted domain information may specify the type of domains (e.g., edge, core, cloud) and/or specific domains that a user selected to use to provision the application. The application level information (312) may further include location information. The location information may include one or more geographical regions and/or locations selected by the user in which to provision the application. The application level information (312) may further include a chaos experiment sandbox indicator (e.g., a flag, a tag, etc.) that may indicate whether the chaos testing is to be performed for the application prior to final provisioning. The application level information (312) may include other and/or additional types of high level information associated with the application corresponding to the manifest (300) without departing from embodiments disclosed herein.

The application task level information (314) may include task specific information associated with the application corresponding to the manifest (300). The task specific information may include an application and/or runtime environment identifier, an application template identifiers, a runtime environment template identifiers, virtual machine template identifiers, task identifiers, task priorities, task execution times, task hardware requirements, task instruction set architecture (ISA) requirements, task accelerator requirements, task operating system requirements, virtual machine requirements, edge runtime environment requirements, cloud runtime environment requirements, and/or security cloud credentials. The application task level information may include other and/or additional task specific information without departing from embodiments disclosed herein.

The application workflow information (316) may include information that specifies the total workflow of the application corresponding to the manifest (300). The application workflow information (316) may include an order of execution for deployment of services of the application, a service dependency graph, an execution time target, a sync policy, a deployment duration, outside dependencies, and/or success criteria. The application workflow information (316) may include other and/or additional types of information associated with the workflow of the application corresponding to the manifest without departing from embodiments disclosed herein.

In one or more embodiments disclosed herein, the data information (320) includes production data information (322) and consumption data information (324. The data information (320) may include other and/or additional information associated with the data produced and/or consumed by the application to be provisioned without departing from embodiments disclosed herein.

In one or more embodiments disclosed herein, the production data information (322) may include information associated with the data produced by the application during execution. The production data information (322) may include, for example, storage identifiers, a list of directories, file system mount points, network addresses, URL addresses, and streaming services endpoints which all, or a portion thereof, may be used by the application to store data generated by the application. The production data information (322) may include other and/or additional information associated with the generation and storage of data generated by the application without departing from embodiments disclosed herein.

In one or more embodiments disclosed herein, the consumption data information (324) may include information associated with the data used by the application during execution. The consumption data information (324) may include, for example, data identifiers, file identifiers, file priorities, storage identifiers, a list of directories, file system mount points, network addresses, URL addresses, and streaming services endpoints which all, or a portion thereof, may be used by the application to access data consumed by the application. The consumption data information (324) may include other and/or additional information associated with the access and storage of data used by the application without departing from embodiments disclosed herein.

In one or more embodiments disclosed herein, the workload resource information (330) includes resource requirement information associated with all, or a portion thereof, the tasks of the application corresponding to the manifest (300). The resource requirement information may include scalar compute information (332), vector compute information (334), memory information (334), network information (336), storage information (338), and/or cloud information (340). The resource requirement information may include other and/or additional types of information associated with the resource requirements of the application tasks without departing from embodiments disclosed herein.

In one or more embodiments disclosed herein, the scalar compute information (332) includes scalar compute resource requirements associated with the application tasks. The scalar compute resource requirements may include task identifiers, critical path clock frequencies, minimum clock frequency, processor type, processor quantity, and/or domain identifiers. The scalar compute resource requirements may include other and/or additional information associated with the scalar compute resource requirements of the application tasks without departing from embodiments disclosed herein.

In one or more embodiments disclosed herein, the vector compute information (334) includes vector compute resource requirements associated with the application tasks. The vector compute resource requirements may include task identifiers, performance metrics (e.g., TeraFlops (TF), Tera Operations Per Second TOPS, etc.), minimum performance metrics (e.g., minimum TF, minimum TOPS, etc.), domain specific accelerator types, processor types, domain identifiers, processor quantities, quantity of GPU memory, quantity of FPGA logic cells, and/or peer-to-peer information (e.g., NVLink, PCIE, inter-GPU network type, etc.). The vector compute resource requirements may include other and/or additional information associated with the vector compute resource requirements of the application tasks without departing from embodiments disclosed herein.

In one or more embodiments disclosed herein, the memory information (334) may specify memory requirements associated with the application tasks. The memory requirements may include task identifiers, memory types, domain identifiers, quantity of memory, and/or minimum quantity of memory. The memory requirements may include other and/or additional information regarding memory requirements of the application tasks without departing from embodiments disclosed herein.

In one or more embodiments disclosed herein, the network information (336) may include network requirements associated with application tasks. The network requirements may include, task identifiers, network type (e.g., Ethernet, RDMA, etc.), types of network devices, average required network bandwidth, peak required network bandwidth, minimum required network bandwidth, and/or quantity of network devices. The network requirements may include other and/or additional information regarding network requirements of the application tasks without departing from embodiments disclosed herein.

In one or more embodiments disclosed herein, the storage information (338) includes data storage requirements associated with the application tasks. The data storage requirements may include, task identifiers, storage device types (e.g., HDDs, NVME, PMEM, etc.), domain identifiers, quantity of storage per domain required, and/or storage size by storage device type and location (e.g., domain type and/or geographical location). The storage requirements may include other and/or additional information regarding storage requirements of the application tasks without departing from embodiments disclosed herein.

In one or more embodiments disclosed herein, the cloud information (340) includes cloud requirements associated with the application tasks. The cloud requirements may include task identifiers, cloud types, cross plane supported configuration options, and/or cloud configuration requirements. The cloud requirements may include other and/or additional information regarding cloud requirements of the application tasks without departing from embodiments disclosed herein.

As discussed herein, an identifier may refer to a unique combination of characters that may be used to specify and/or identify a particular entity. The characters may include numerical characters referencing numbers assigned to particular entities. The characters may refer to alphabetical characters referencing a name assigned to particular entities. The characters may further refer to alphanumeric characters that includes a combination of numeric characters and alphabetic characters. An identifier may refer to a local (e.g., may be used by a particular executing entity such as the global controller) and/or a global identifier (e.g., may be used by all executing entities within the system) without departing from embodiments disclosed herein.

Figure 4:
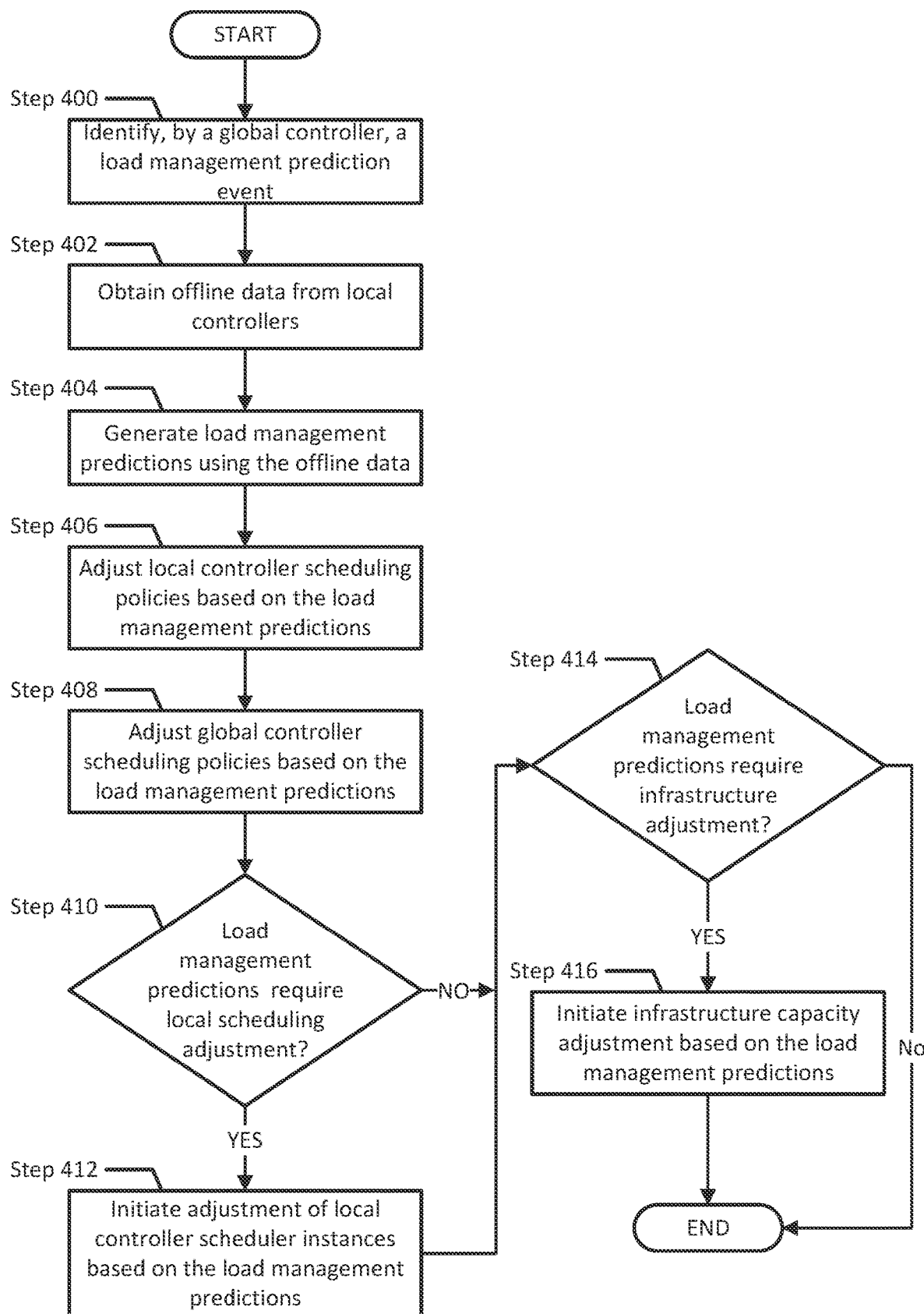
FIG. 4 shows a flowchart of a method for performing load management for an MCIE environment in accordance with one or more embodiments disclosed herein.

FIG. 4 shows a flowchart of a method for performing load management for an MCIE environment in accordance with one or more embodiments disclosed herein. The method of FIG. 4 may be performed by, for example, the global controller (104, FIG. 1A). Other components illustrated in FIG. 1A may perform all, or a portion, of the steps shown in FIG. 4 without departing from embodiments disclosed herein. While the various steps in the flowchart shown in FIG. 4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

Turning to FIG. 4, at Step 400, a load management prediction event is identified by a global controller. In one or more embodiments disclosed herein, the global controller monitors for the occurrence of a load management prediction event. The load management prediction event may include obtaining a request from a user (e.g., an MCIE environment system administrator), identifying the occurrence of a point in time specified load management prediction schedule, etc. The load management prediction event may include other and/or additional types of events associated with generating load management predictions without departing from embodiments disclosed herein. The global controller may identify the occurrence of one of the aforementioned events as a load management prediction event. A load management prediction event may be identified by the global controller via other and/or additional methods without departing from embodiments disclosed herein.

At Step 402, offline data is obtained from local controllers. In one or more embodiments disclosed herein, the local controllers of the MCIE environment generate and/or obtain offline data associated with loads of the environment. The local controllers may store the offline data in a storage location that is accessible by the global controller (e.g., a distributed storage system, peer-to-peer file system, network file system, etc.), which the global controller may use to obtain the offline data. In other embodiments disclosed herein, the local controllers may periodically provide the offline data to the global controller, and the global controller may store the offline data in one or more storage devices associated with the global controller. In still other embodiments disclosed herein, the global controller may send requests for offline data to the local controllers, and the local controllers may provide the offline data to the global controller in response to obtaining the requests. Moreover, for portions of offline data associated with the global controller itself, the global controller may generate and/or obtain such portions of the offline data and store the portions of offline data in a storage device associated with the global controller. Offline data may be obtained from local controllers via other and/or additional methods without departing from embodiments disclosed herein.

In one or more embodiments disclosed herein, offline data may refer to one or more data structures that includes past and/or present load information associated with the MCIE environments. The offline data may be, for example, time series data associated with any point in time in the past and/or the present. The load information may be associated with the global controller, the local controllers of the MCIE domains, and the devices included in the MCIE domains. The load information may include a quantity of application provisioning requests being processed by the global controller, global controller resource utilization (e.g., compute resources, domain accelerator resources, network resources, memory resources, storage resources, etc.) (e.g., percentages of resources currently in use), quantity of global scheduler instances, quantity of scheduling jobs associated with local controllers, quantity of application tasks included in backlogs of the local controllers, quantity of local scheduler instances, local controller resource utilization, MCIE domain device resource utilizations, and/or SLOs (e.g., latency, quantity of failed service requests, etc.) associated with applications executing on the MCIE domain devices. The load information may include other and/or additional types of information that may be used to generate load management predictions without departing from embodiments disclosed herein. As discussed above, the load information may be associated with points in time.

At Step 404, load management predictions are generated using the offline data. In one or more embodiments disclosed herein, the global controller generates load management predictions by applying one or more load management prediction algorithms to the offline data. The load management prediction algorithms may include, for example, metaheuristic algorithms. The metaheuristic algorithms may include, for example, case based reasoning algorithms, digital annealing algorithms, and/or linear regression trend analysis algorithms. The load management prediction algorithms may include other and/or additional types of prediction algorithms capable of generating load management prediction using the offline data. The load management predictions may be generated using the offline data via other and/or additional methods without departing from embodiments disclosed herein.

In one or more embodiments disclosed herein, the load management predictions refer to one or more data structures that include forecasts of load information associated with the MCIE environment. The load management predictions may include future forecasts of load information associated with one or more future points in time. The load management predictions may be associated with short term forecasts (e.g., hourly load information associated with the next day, daily load information associated with the next week, etc.), medium term forecasts (e.g., daily load information associated with the next month, hourly load information associated with the next month, etc.), and/or long term forecasts (e.g., daily load information associated with the next year, weekly load information associated with the next year, and/or monthly load information associated with the next year, etc.). For additional information regarding load information, refer to the discussion of Step 402. The load management predictions may include other and/or additional information associated with future load information of the MCIE environment without departing from embodiments disclosed herein.

At Step 406, local controller scheduling policies are adjusted based on the load management predictions. As discussed above, the load management predictions may include forecasts of future load information. The forecasts of future load information may be associated with the local controllers. The global controller may compare the load management prediction with capacity information associated with the load controllers. The capacity information may specify the current load information and load capabilities associated with the local controllers of the MCIE domain. The load capabilities may include a quantity of scheduling jobs a local controller may service at a period of time, the quantity of application tasks that can be scheduled by a local controller from a backlog at a period of time, and/or maximum resource capacities of local controllers. The load capabilities may include other and/or additional information regarding the amount of loads that local controllers may be able to handle without departing from embodiments disclosed herein. The global controller may compare the load management predictions with the capacity information and adjust the scheduling policies associated with local controllers based on the comparison.

For example, the load management predictions may specify that the future load may be greater than the capability information associated with a local controller (e.g., above a percentage threshold). As a result, the global controller may adjust the selection of scheduling policies associated with the local controller to meet the higher load demand. The global controller may adjust the selection of scheduling policies by, for example, not selecting computationally intensive scheduling policies (e.g., makespan minimization, scheduling efficiency), and/or lowering the priorities associated with computationally intensive scheduling policies. The global controller may schedule the scheduling policy adjustments for the future points in time and/or time periods associated with the load management prediction.

In another example, the load management predictions may specify that the future load may be less than the capability information associated with a local controller (e.g., below a percentage threshold). As a result, the global controller may adjust the selection of scheduling policies associated with the local controller to meet the lower load demand. The global controller may adjust the selection of scheduling policies by, for example, again selecting computationally intensive scheduling policies (e.g., makespan minimization, scheduling efficiency), and/or raising the priorities associated with computationally intensive scheduling policies. The global controller may schedule the scheduling policy adjustments for the future points in time and/or time periods associated with the load management prediction.

Local controller scheduling policies may be adjusted based on the load management predictions via other and/or additional methods without departing from embodiments disclosed herein.

At Step 408, global controller scheduling is adjusted based on the load management predictions. As discussed above, the load management predictions may include forecasts of future load information. The forecasts of future load information may be associated with the global controller. The global controller may compare the load management prediction with capacity information associated with the global controller. The capacity information may specify the current load information and load capabilities associated with the global controller. The load capabilities may include a quantity of application provisioning requests the global controller may service at a period of time and/or maximum resource capacities of the global controller. The load capabilities may include other and/or additional information regarding the amount of load that that the global controller may be able to handle without departing from embodiments disclosed herein. The global controller may compare the load management predictions with the capacity information and adjust the scheduling associated with global controller based on the comparison.

For example, the load management predictions may specify that the future load may be greater than the capability information associated with the global controller (e.g., above a percentage threshold). As a result, the global controller may increase the number of global scheduler instances (e.g., horizontally scaling out) and/or increase the resource capacity of the global controller (e.g., vertically scaling up). The global controller may schedule the adjustments for the future points in time and/or time periods associated with the load management prediction.

In one or more embodiments disclosed herein, a global scheduler instance refers to a collection of computing instructions, which when executed by one or more processors of the global controller, causes the global controller to provide the functionality of the global controller. The global controller may execute any number of global scheduler instances without departing from embodiments disclosed herein.

In another example, the load management predictions may specify that the future load may be less than the capability information associated with the global controller (e.g., below a percentage threshold). As a result, the global controller may decrease the number of global scheduler instances (e.g., horizontally scaling in) and/or decrease the resource capacity of the global controller (e.g., vertically scaling down). The global controller may schedule the adjustments for the future points in time and/or time periods associated with the load management prediction.

Global controller scheduling may be adjusted based on the load management predictions via other and/or additional methods without departing from embodiments disclosed herein.

At Step 410, a determination is made as to whether the load management predictions require local scheduling adjustment. In addition to the adjusting scheduling policies associated with local controller as discussed in Step 406, the global controller may also initiate the adjustment of the number of local scheduler instances to meet changes in load of local controllers. As discussed above, the load management predictions may include forecasts of future load information. The forecasts of future load information may be associated with the local controllers. The global controller may compare the load management predictions with capacity information associated with the load controllers to determine whether the load management predictions require local scheduling adjustment.

In one or more embodiments disclosed herein, if the load management predictions indicate that a future local controller load is above and/or below a percent difference and/or absolute threshold of the current load (or max load) specified by the capacity information, then the global controller may determine that the load management predictions require local scheduling adjustments. In one or more embodiments disclosed herein, if the load management predictions indicate that a future local controller load is not above and/or below a percent difference threshold of the current load (or max load) specified by the capacity information, then the global controller may determine that the load management predictions do not require local scheduling adjustments. The determination as to whether the load management predictions require local scheduling adjustment may be made via other and/or additional methods without departing from embodiments disclosed herein.

In one or more embodiments disclosed herein, if it is determined that the load management predictions require a local scheduling adjustment, then the method proceeds to Step 412. In one or more embodiments disclosed herein, if it is determined that the load management predictions do not require a local scheduling adjustment, then the method proceeds to Step 414.

At Step 412, adjustment of local controller scheduling instances are initiated based on the load management predictions. The load management predictions may specify that the future load of a local controller may be greater than the current load or max load specified by the capacity information associated with the local controller. As a result, the global controller may request or send instructions to the local controller to increase the number of local scheduler instances (e.g., horizontally scaling out). The global controller may schedule the adjustments for the future points in time and/or time periods associated with the load management prediction. The load management predictions may specify that the future load of a local controller may be less than the current load or max load specified by the capacity information associated with the local controller. As a result, the global controller may request or send instructions to the local controller to decrease the number of local scheduler instances (e.g., horizontally scaling in). The global controller may schedule local controller adjustments for the future points in time and/or time periods associated with the load management prediction. Adjustment of local controller scheduling instances may be initiated based on the load management predictions via other and/or additional methods without departing from embodiments disclosed herein.

In one or more embodiments disclosed herein, a local scheduler instance refers to a collection of computing instructions, which when executed by one or more processors of a local controller, causes the local controller to provide the functionality of the local controller. A local controller may execute any number of local scheduler instances without departing from embodiments disclosed herein.

At Step 414, a determination is made as to whether the load management predictions require an infrastructure adjustment. As discussed above, the load management predictions may include forecasts of future load information. The forecasts of future load information may be associated with devices of the MCIE domains. The global controller may compare the load management predictions with capacity information (e.g., resource capacities) associated with the devices of the MCIE domain to determine whether the load management predictions require an infrastructure adjustment.

In one or more embodiments disclosed herein, if the load management predictions indicate that a future MCIE device load is above a percent difference and/or absolute threshold of the current load (or max load) specified by the capacity information, then the global controller may determine that the load management predictions require local infrastructure adjustments. In one or more embodiments disclosed herein, if the load management predictions indicate that a future MCIE device load is not above a percent difference threshold of the current load (or max load) specified by the capacity information, then the global controller may determine that the load management predictions do not require infrastructure adjustments. The determination as to whether the load management predictions require an infrastructure adjustment may be made via other and/or additional methods without departing from embodiments disclosed herein.

In one or more embodiments disclosed herein, if it is determined that the load management predictions require an infrastructure adjustment, then the method proceeds to Step 414. In one or more embodiments disclosed herein, if it is determined that the load management predictions do not require an infrastructure adjustment, then the method ends following Step 414.

At Step 416, infrastructure adjustments are initiated based on the load management predictions. The global controller may initiate infrastructure adjustments by rescheduling all, or portions thereof (e.g., application tasks) associated with load management predictions that require infrastructure adjustments. The global controller may also initiate infrastructure adjustments by requesting infrastructure upgrades (e.g., resource upgrades) from users of the MCIE environment (e.g., system administrators) of MCIE domains associated with load management predictions that require infrastructure adjustments. Infrastructure adjustments may be initiated based on the load management predictions via other and/or additional methods without departing from embodiments disclosed herein.

In one or more embodiments disclosed herein, the method ends following Step 416.

First Example

The following section describes a first example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in these particular examples. The example is intended to include simple examples to illustrate, at least in part, concepts described herein.

Consider a scenario in which a global controller performs load management services for an MCIE environment using load management predictions. At a first point in time, the global controller identifies a load management prediction event. The load management prediction event includes the occurrence of a point in time specified by a load management prediction schedule. The global controller obtains offline data from a shared storage system accessible by the global controller and the local controllers of the MCIE environment. The global controller then applies a load management prediction model to the offline data to generate load management predictions.

The global controller then compares capacity information associated with the global controller, the local controllers, and the MCIE domains with the load management predictions. As a result, the global controller identifies several adjustment requirements: (i) a forecasted spike in application provisioning requests submitted to the global controller in the next six hours, (ii) a forecasted lull in scheduling jobs associated with a first local controller for the next day, (iii) a forecasted spike in overall scheduling jobs associated with a second local controller for the next month, and (iv) a forecasted resource exhaustion of a device within an MCIE domain in the next week.

Based on the first adjustment requirement, the global controller schedules an increase in global scheduler instances over the next six hours to handle the predicted spike in application provisioning requests. Based on the second adjustment requirement, the global controller sets the highest priority for the makespan minimization protection policy and decreases the quantity of local scheduler instances for the first local controller over the course of the next day to efficiently deal with the lull in scheduling jobs. Based on the third adjustment requirement, the global controller deselects the makespan minimization scheduling policy and increases the quantity of local scheduler instances over the next month to meet the predicted spike in scheduling jobs for the second local controller. Finally, based on the fourth adjustment requirement, the global controller initiates the rescheduling of the application executing on the device of the MCIE domain that is predicted to experience resource exhaustion.

End of First Example

Figure 5:
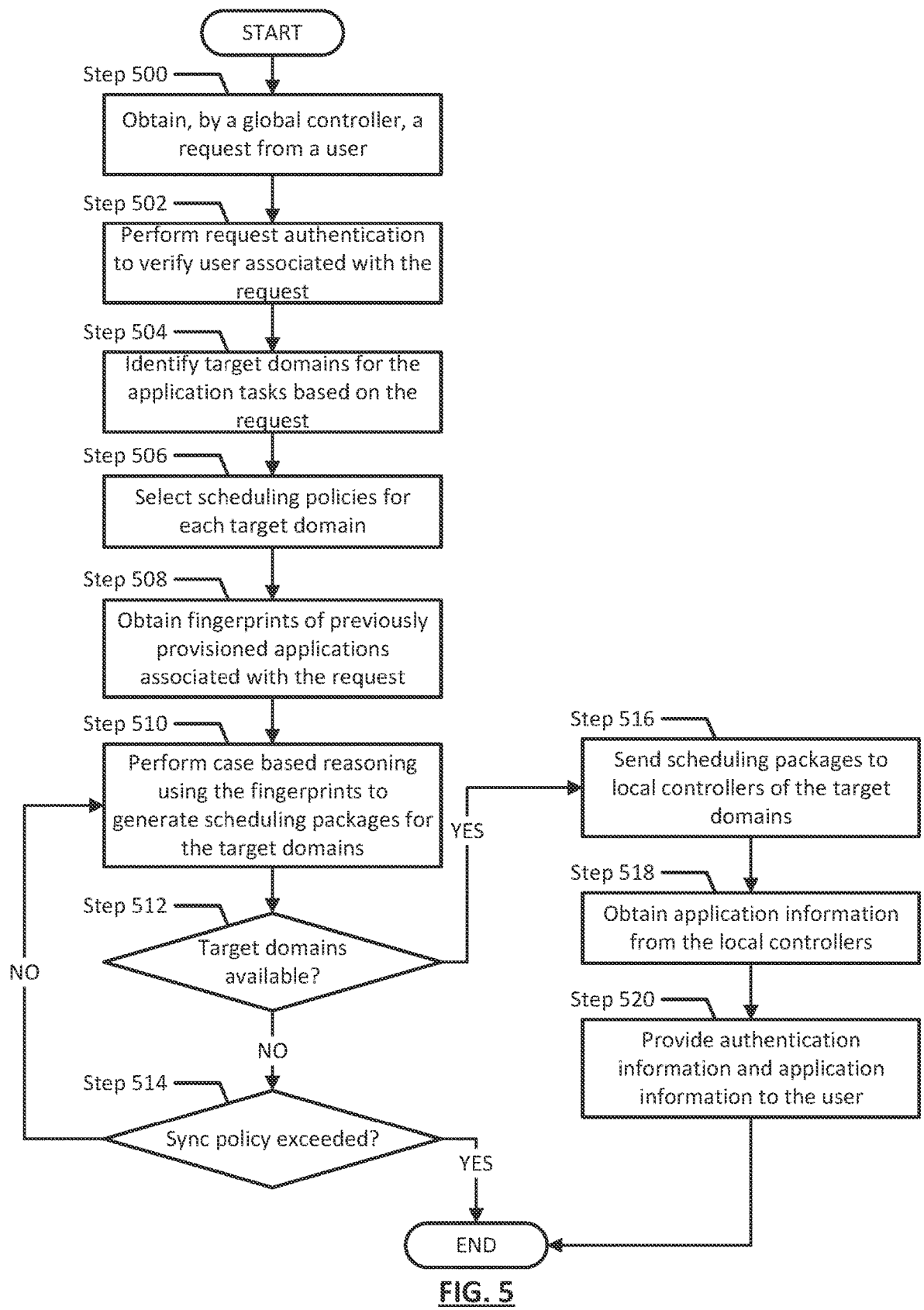
FIG. 5 shows a flowchart of a method for provisioning an application using case based reasoning in accordance with one or more embodiments disclosed herein.

FIG. 5 shows a flowchart of a method for provisioning an application using case based reasoning in accordance with one or more embodiments disclosed herein. The method of FIG. 5 may be performed by, for example, the global controller (104, FIG. 1A). Other components illustrated in FIG. 1A may perform all, or a portion, of the steps shown in FIG. 5 without departing from embodiments disclosed herein. While the various steps in the flowchart shown in FIG. 5 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

At Step 500, a request from a user is obtained. In one or more embodiments disclosed herein, the request is obtained from the user through the application service layer using any appropriate method of data transmission. As an example, the application service layer may communicate the request as network data traffic units over a series of network devices that operatively connect the application service layer and the global controller. The request may be obtained from the user via other and/or additional methods without departing from embodiments disclosed herein.

At Step 502, request authentication is performed to verify user associated with the request. As discussed above, the request may include authentication information associated with the user. The authentication information may include, for example, a user identifier, a company identifier, security credentials (e.g., a username, a password, a personal identification number (PIN), etc.), and/or security information (e.g., encryption keys, digital signatures, etc.). In one or more embodiments disclosed herein, the global control uses the authentication information included in the request to perform authentication to verify the user associated with the request. The global controller may use any appropriate method for performing authentication using the authentication information without departing from embodiments disclosed herein. For example, the global controller may compare a user identifier, company identifier, and/or security credentials with a list of existing user identifiers, company identifiers, and/or security credentials maintained by the global controller and verify the user by identifying a match between the user identifier, company identifiers, and/or security credentials. The global controller may perform request authentication to verify the user associated with the request via other and/or additional methods without departing from embodiments disclosed herein.

Although not illustrated in the flowchart of FIG. 4A, if the global controller is unable to verify the user associated with the request, then the method may end following Step 402. In another embodiment disclosed herein, if the global controller is unable to verify the user associated with the request, then the global controller may send an error notification that specifies that the request authentication failed to the user. After sending the error notification, the method may end following Step 402.

At Step 504, target domains are identified for the application tasks based on the request. In one or more embodiments disclosed herein, the global controller identifies target domains for the application tasks based on the manifest included in the request and capability information associated with the domains included in the MCIE environment. As discussed above, the manifest may include information that the global controller may use to schedule the application to one or more target domains included in the MCIE environment information. For each application task, the global controller may identify a target domain that satisfies the scheduling requirements included in the manifest. The scheduling requirements may include user specified domain types, hardware requirements (e.g., compute requirements, memory requirements, domain accelerator requirements, network requirements, and/or storage requirements), geographical location requirements, etc. The global controller may use capability information associated with the MCIE domains provided by the local controllers (e.g., all or a portion of the graph database) to specify the capabilities of the MCIE domains. Any quantity of target domains may be identified for any quantity of application tasks without departing from embodiments disclosed herein. Target domains for the application tasks may be identified via other and/or additional methods without departing from embodiments disclosed herein.

At Step 506, scheduling policies are selected for each target domain. In one or more embodiments disclosed herein, the global controller selects scheduling policies based on the manifest. In addition to the discussion of FIG. 3, the manifest included in the request may specify whether a user has requested to select a particular scheduling policy and, if selected, a priority associated with the selected scheduling policy. As discussed above, the scheduling policies may include makespan minimization, scheduling efficiency, resource utilization, and resource cost. In addition to the manifest, the global controller may select scheduling policies and/or associated priorities based on load information associated with the local controllers. The global controller may have access to current and/or future predicted load information associated with the local controllers of the target domains. For local controllers associated with high loads (e.g., performing a scheduling a large quantity of application tasks or include a larger quantity of application task scheduling jobs than a configurable backlog limit), then the global controller may deprioritize or refrain from selecting computationally intensive scheduling policies such as makespan minimization. The global controller may select scheduling policies for each target domain via other and/or additional methods without departing from embodiments disclosed herein.

At Step 508, fingerprints of previously provisioned applications associated with the request are obtained. In one or more embodiments disclosed herein, the local controllers of the MCIE environment generate fingerprints associated with applications executing in the environment. For additional information regarding the generation of fingerprints, refer to FIG. 7. The local controllers may store the fingerprints in a storage location that is accessible by the global controller (e.g., a distributed storage system, peer-to-peer file system, network file system, etc.) which the global controller may use to obtain the fingerprints. In other embodiments disclosed herein, the local controllers may periodically provide the fingerprints to the global controller, which may store the fingerprints in one or more storage devices associated with the global controller. In still other embodiments disclosed herein, the global controller may send requests for fingerprints to the local controllers, and the local controllers may provide the fingerprints to the global controller in response to obtaining the requests. The global controller may obtain fingerprints associated with the request (e.g., application specified by the request) by obtaining fingerprints associated with the application template and/or application identifier included in manifest obtained with the request. Fingerprints of previously provisioned applications associated with the request may be obtained via other and/or additional methods without departing from embodiments disclosed herein.

In one or more embodiments disclosed herein, a fingerprint may refer to one or more data structures that includes fingerprint information associated with the aggregated behavior of previously provisioned applications. The fingerprint information may include SLO metrics (e.g., application request latencies, quantities of successfully serviced requests, quantity of failed requests, etc.) and/or application task resource metrics (e.g., domain types, resource types, resource quantities, average resource utilization, max resource utilizations, etc. associated with the application tasks of the application). The fingerprint information may be associated with any quantity of instances of an application executing in any quantity of domains. The fingerprint information may further specify application tasks associated with application. The fingerprint information may include user identifiers associated with users that use and/or provisioned the application. The fingerprint information may include other and/or additional types of information associated with previously provisioned applications without departing from embodiments disclosed herein.

At Step 510, case based reasoning is performed using the fingerprints to generate scheduling packages for the target domains. In one or more embodiments disclosed herein, the global controller applies a case based reasoning algorithm to the fingerprints to generate fingerprint scheduling criteria associated with the application. The case based reasoning algorithm may include any appropriate case based reasoning algorithm without departing from embodiments disclosed herein. The case based reasoning algorithm may perform statistical analysis on the fingerprints to identify anomalous behavior associated with the previously provisioned applications. The anomalous behavior may be associated with variances (e.g., greater than a configurable percent difference between average values) of SLO metrics and/or application task resource metrics. The case based reasoning algorithm may further identify potential sources of anomalous behavior and specify those sources as fingerprint scheduling criteria. Examples of sources of anomalous behavior may include resource types, location, network access, resource quantities, neighbor applications, etc. For example, the fingerprints may include anomalous behavior in domains that do not include a particular GPU. As a result the case based reasoning algorithm may specify a fingerprinting scheduling criteria associated with the request to not provision the application in a domain that includes that particular GPU. The fingerprint scheduling criteria may be used to refine the target domains and/or identify new target domains without departing from embodiments disclosed herein.

In one or more embodiments disclosed herein, the global controller generates a scheduling package for each target domain.

In one or more embodiments disclosed herein, a scheduling package may refer to one or more data structures that may be used by the local controller of an associated target domain to perform domain level scheduling services. The scheduling package may specify the application task(s) to be scheduled, all, or a portion thereof, the information included in the manifest associated with the application task(s), and the selected scheduling policies and the associated priorities of the selected scheduling policies. A scheduling package may include other and/or additional information that may be used to perform domain level scheduling services without departing from embodiments disclosed herein.

In one or more embodiments disclosed herein, the global controller generates a scheduling package for each target domain.

In one or more embodiments disclosed herein, a scheduling package may refer to one or more data structures that may be used by the local controller of an associated target domain to perform domain level scheduling services. The scheduling package may specify the application task(s) to be scheduled, all, or a portion thereof, the information included in the manifest associated with the application task(s), and the selected scheduling policies and the associated priorities of the selected scheduling policies. A scheduling package may include other and/or additional information that may be used to perform domain level scheduling services without departing from embodiments disclosed herein.

Case based reasoning is performed using the fingerprints to generate scheduling packages for the target domains via other and/or additional methods without departing from embodiments disclosed herein.

At Step 512, a determination is made as to whether the target domains are available. In one or more embodiments disclosed herein, the global controller uses capacity information associated with each target domain to determine whether the target domain includes the available capacity to execute the associated application task(s). As discussed above, the global controller may obtain capacity information (e.g., as included in the graph database) from the local controller associated with each information. The global controller may compare the scheduling requirements associated each application task with the corresponding target domain's available capacity. In one or more embodiments disclosed herein, if the available capacity of the target domains exceeds the storage requirements of all associated application tasks, then the global controller may determine that the target domains are available. In one or more embodiments disclosed herein, if the available capacity of the target domains does not exceed the storage requirements of all associated application tasks, then the global controller may determine that not all the target domains are available. The global controller may determine whether the target domains are available via other and/or additional methods without departing from embodiments disclosed herein.

In one or more embodiments disclosed herein, if it is determined that the target domains are available, then the method proceeds to Step 516. In one or more embodiments disclosed herein, if it is determined that the target domains are not available, then the method proceeds to Step 514.

At Step 514, a determination is made as to whether a sync policy is exceeded. In one or more embodiments disclosed herein, a sync policy may refer to one or more data structures that include retry requirements associated with application. The retry requirements may specify a retry count limit and/or a retry time limit The retry count limit may begin upon receipt of the request. The sync policy may be included in the manifest. In one or more embodiments disclosed herein, the global controller checks retry count and/or the retry time exceed the retry count limit and/or the retry time limit respectively. In one or more embodiments disclosed herein, if the retry count and/or the retry time do not exceed the retry count limit and/or the retry time limit respectively, then the global controller may determine that the sync policy is not exceeded. In one or more embodiments disclosed herein, if the retry count or the retry time exceed the retry count limit or the retry time limit respectively, then the global controller may determine that the sync policy is exceeded. The determination as to whether the sync policy is exceeded may be made via other and/or additional methods without departing from embodiments disclosed herein.

In one or more embodiments disclosed herein, if it is determined that the sync policy is exceeded, then the method ends following Step 514. In one or more embodiments disclosed herein, if it is determined that the sync policy is not exceeded, then the method proceeds to Step 514. In one or more embodiments disclosed herein, the global controller generates a scheduling package for each target domain.

At Step 516, the scheduling packages are sent to the local controllers of the target domains. In one or more embodiments disclosed herein, a scheduling package may refer to one or more data structures that may be used by the local controller of an associated target domain to perform domain level scheduling services. The scheduling package may specify the application task(s) to be scheduled, all, or a portion thereof, the information included in the manifest associated with the application task(s), and the selected scheduling policies and the associated priorities of the selected scheduling policies. A scheduling package may include other and/or additional information that may be used to perform domain level scheduling services without departing from embodiments disclosed herein.

In one or more embodiments disclosed herein, the global controller sends to generated scheduling packages to the local controllers of the associated target domains. In one or more embodiments disclosed herein, the scheduling packages are sent to the local controllers using any appropriate method of data transmission. As an example, the global controller may communicate the scheduling packages as network data traffic units over a series of network devices that operatively connect the local controllers of the target domains and the global controller. The scheduling packages may be sent to the local controllers of the target domains via other and/or additional methods without departing from embodiments disclosed herein.

At Step 518, application access information is obtained from the local controllers. After obtaining the scheduling packages, the local controllers may use the scheduling packages to perform domain level scheduling services. As a result, the local controllers may send scheduling assignments and provisioning commands to endpoint controllers, which may implement the scheduling assignments and provisioning commands to instantiate the application tasks within the target domains. Additionally, the local controllers may obtain and/or generate application access information associated with the application from the local controllers. The local controllers may then provide the application access information to the global controller. In one or more embodiments disclosed herein, the application access information is sent to the global controller using any appropriate method of data transmission. As an example, the local controllers may communicate the application access information as network data traffic units over a series of network devices that operatively connect the local controllers of the target domains and the global controller. Application access information may be obtained from the local controllers via other and/or additional methods without departing from embodiments disclosed herein.

In one or more embodiments disclosed herein, the application access information refers to one or more data structures that may be used by the user that submitted the request to access the application provisioned within the MCIE environment. The application access information may include access information associated with the application. The application access information may include domain identifiers, device identifiers, URLs, network addresses, etc. associated with the provisioned application. The application access information may include other and/or additional information associated with provisioned application without departing from embodiments disclosed herein.

At Step 520, authentication information and application access information are provided to the user. In one or more embodiments disclosed herein, the authentication information and the application access information are provided to the user through the application service layer using any appropriate method of data transmission. As an example, the global controller may communicate the authentication information and the application access information as network data traffic units over a series of network devices that operatively connect the application service layer and the global controller. The authentication information may be one or more data structures that include a correlation identifier which may be associated with the provisioned application which the user may use to access and submit further request associated with the provisioned application. The authentication information may include other and/or additional information (e.g., a user identifier, successful provisioning confirmation, etc.). The authentication information and the application access information may be provided to the user via other and/or additional methods without departing from embodiments disclosed herein.

In one or more embodiments disclosed herein, the method ends following Step 520.

Second Example

The following section describes a second example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in these particular examples. The example is intended to include simple examples to illustrate, at least in part, concepts described herein.

Consider a scenario in which a global controller provisions an application in an MCIE environment using case based reasoning. At a first point in time, a user submits an application provisioning request to the global controller through the application service layer. The request includes a user identifier and a personal identification number (PIN) associated with the user. In response to obtaining the request, the global controller performs request authentication to verify the user associated with the request. The global controller includes a list of registered user identifiers and PINs associated with each user identifier. The global controller performs authentication to verify the user by determining the user identifier and the PIN included in the request match a user identifier and corresponding PIN included in the list of registered users stored in the global controller.

After performing request authentication, the global controller determines whether the request is a create request. The request further includes a manifest. The manifest includes a request directive. The global controller identifies the request directive indicates that the application provisioning request is a create request for scheduling a new application within the MCIE environment. Next, the global controller identifies that the manifest specifies that the application includes twenty application tasks. The global controller then identifies that the manifest specifies that the user desires to provision the application in the geographical region of the state of Texas. The global controller then identifies, using capability information associated with the domains included in the MCIE environment, that the MCIE environment includes one cloud domain, two core domains, and ten edge domains in the state of Texas.

After identifying the domains included in the state of Texas, the global controller uses the scheduling requirements (e.g., hardware requirements) associated with each application task and capability information associated with the application tasks to identify target domains that satisfy the scheduling requirements. The target domains include the cloud domain, one of the two core domains, and one of the edge domains. Ten application tasks are to be scheduled into the cloud domain, seven application tasks are to be scheduled in the core domain, and the remaining three application tasks are to be scheduled in the edge domain. After identifying the target domains associated with each application task, the global controller then selects scheduling policies for each target domain. The global controller determines that the manifest specifies that the user has selected the default priority and selection of scheduling policies. As a result, each target domain will include the following scheduling policies in order from highest to lowest priority, makespan minimization, scheduling efficiency, resource utilization, and resource cost.

After selecting the scheduling policies for each target domain, the global controller then obtains fingerprints associated with previously provisioned applications using an application identifier included in the manifest. The global controller then performs case based reasoning on the fingerprints to generate fingerprint scheduling criteria. The fingerprint scheduling criteria specifies that the application is not to be provisioned in edge domains, as previously provisioned application tasks executing on edge domains experienced significant latency issues and resource exhaustion. As a result, the global controller refines the target domains to include only the cloud domain and the two core domains, with the three applications originally scheduled for the edge domain reassigned to the core domain.

The global controller then determines whether each target domain is available by comparing the scheduling requirements of the application tasks associated with the target domains to capacity information associated with the target domains. For each of the two target domains, the capacity information exceeds the scheduling requirements. Accordingly, the global controller determines that each of the two target domains are available.

In response to the determination, the global controller generates a scheduling package for each of the target domains. The scheduling packages include the application tasks scheduled to the corresponding domains. The scheduling packages also include the selected scheduling policies and manifest information associated with each of the application tasks associated with the scheduling packages. The global controller then sends the scheduling packages to local controllers of the target domains (e.g., the cloud domain, the core domain, and the edge domain). In response to obtaining the scheduling packages, the local controller each perform domain level scheduling for the application tasks associated with their domains, thereby instantiating the application tasks on devices included in each of the domains.

As a result, the local controllers obtain application access information including URLs and network addresses that the user may use to access the portions of the application provisioned to the three domains. The local controller provides the application access information to the global controller, which then provides the application access information to the user through the application service layer. The global controller also generates a correlation identifier associated with the provisioned application. The correlation identifier may also be provided by the user, who may use the correlation identifier to access the application and submit future application provisioning request associated with the application.

End of Second Example

Figure 6:
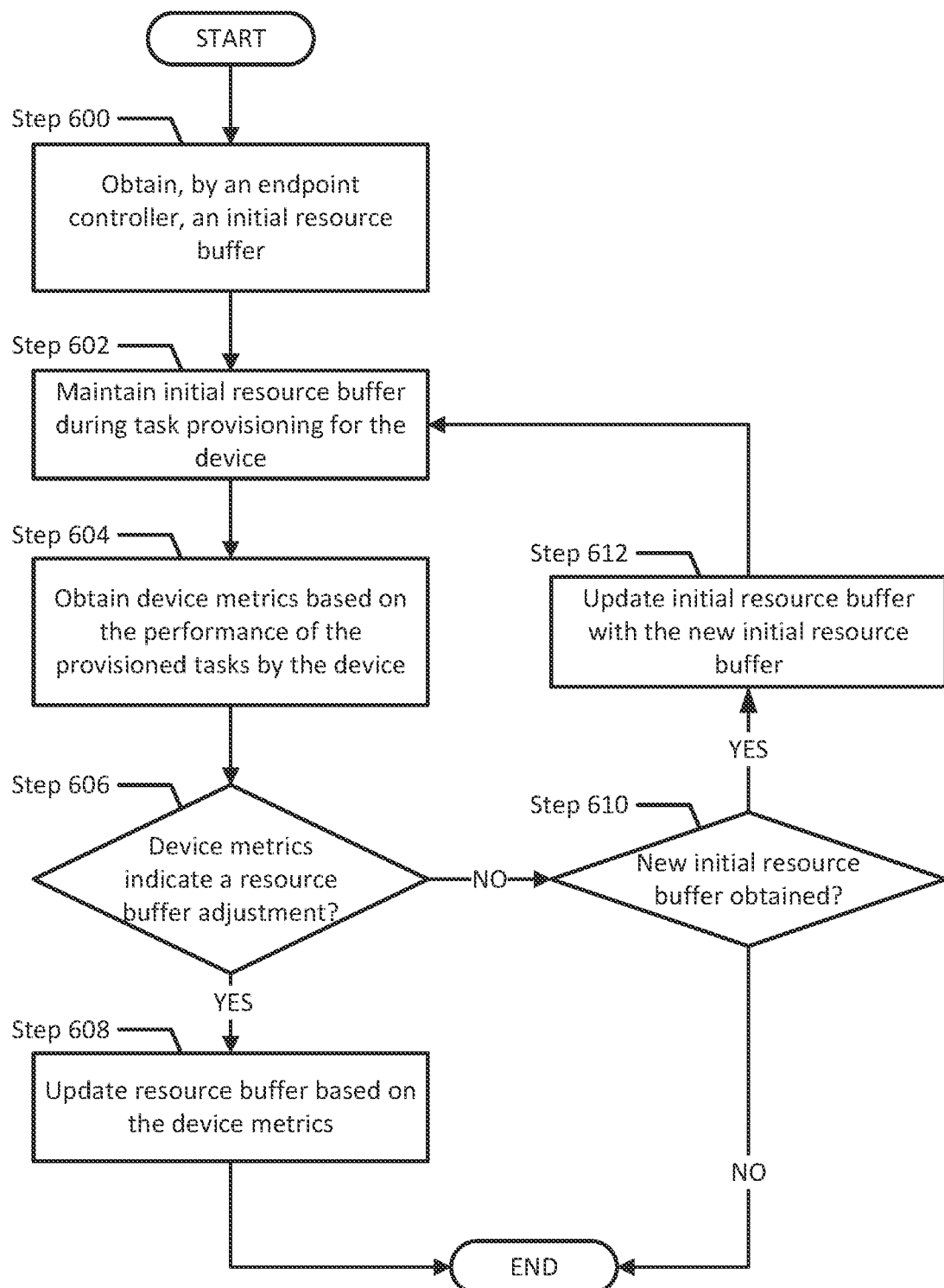
FIG. 6 shows a flowchart of a method for managing a resource buffer for a device in accordance with one or more embodiments disclosed herein.

FIG. 6 shows a flowchart of a method for managing a resource buffer for a device in accordance with one or more embodiments disclosed herein.

The method of FIG. 6 may be performed by, for example, an endpoint controller (126A, FIG. 1B). Other components illustrated in FIG. 1A and FIG. 1B may perform all, or a portion, of the steps shown in FIG. 6 without departing from embodiments disclosed herein. While the various steps in the flowchart shown in FIG. 6 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

At Step 600, an initial resource buffer is obtained by an endpoint controller. As discussed above, the global controller may generate resource buffers associated with devices in the MCIE environment. The global controller may generate an initial resource buffer for the device associated with the endpoint controller. The global controller may provide the initial resource buffer to a local controller associated with the endpoint controller, which may in turn provide the initial resource buffer to the endpoint controller. In one or more embodiments disclosed herein, the initial resource buffer is sent to the endpoint controller using any appropriate method of data transmission. As an example, the global controller and, in turn, the local controller may also communicate the initial resource buffer as network data traffic units over a series of network devices that operatively connect the global controller, the local controller, and the endpoint controller. The initial resource buffer may be obtained by an endpoint controller via other and/or additional methods without departing from embodiments disclosed herein.

In one or more embodiments disclosed herein, the resource buffer refers to one or more data structures that specify a portion of the resources of a device that should be left unallocated to handle load spikes associated with application tasks executing on the device. The resource buffer may be implemented as a percentage of the overall capacity of the resources of the device. The resource buffer may include a percentage of the capacity of each resource of the device. The resource buffer may include other and/or additional information that may be used to maintain an unallocated portion of device resources without departing from embodiments disclosed herein.

At Step 602, the initial resource buffer is obtained during task provisioning for the device. As discussed above, the endpoint controller may implement scheduling assignments obtained from the local controller to instantiate application tasks on the device associated with the endpoint controller. While scheduling application tasks, the endpoint controller may maintain the initial resource buffer. In other words, the endpoint controller may allocate resources of the device to execute the application tasks so that the amount of unallocated resources never drops below the initial resource buffer. If implementing the scheduling assignments results in the amount of unallocated resources dropping below the initial resource buffer, then the endpoint controller may not implement the scheduling assignments and may notify the local controller to reschedule the application tasks included in the scheduling assignments to a different device. The initial resource buffer may be maintained during tasking provisioning for the device via other and/or additional methods without departing from embodiments disclosed herein.

At Step 604, device metrics based on the performance of the provisioned tasks are obtained. The endpoint controller may execute one or more monitoring services that generate or otherwise obtain device metrics associated with the performance of the provisioned application tasks. The device metrics may include resource usage information. The resource usage information may specify the percentage of resources of the device used to execute each application task provisioned on the device. The device metrics may include other and/or additional information associated with the performance of the provisioned application tasks on the device without departing from embodiments disclosed herein. Device metrics based on the performance of the provisioned tasks may be obtained via other and/or additional methods without departing from embodiments disclosed herein.

At Step 606, a determination is made as to whether the device metrics indicate a resource buffer adjustment. As discussed above, device metrics that specify percentages of resources of the device used to execute application tasks may be obtained. The device metrics may be periodically obtained over time and may include device metrics associated with any point in time or periods of time in the past and/or the present. The endpoint controller may check the device metrics to determine whether the device metrics indicate a resource buffer adjustment. The endpoint controller may use, for example, percent difference thresholds to determine whether the device metrics indicate whether the resource buffer should be adjusted. In one or more embodiments disclosed herein, if it is determined that the percent difference between the minimum unallocated resources specified by the device metrics and the resource buffer is above/below an upper/lower threshold, then the endpoint controller determines that the device metrics indicate a resource buffer adjustment. In one or more embodiments disclosed herein, if it is determined that the percent difference between the minimum unallocated resources specified by the device metrics and the resource buffer is not above/below an upper/lower threshold, then the endpoint controller determines that the device metrics do not indicate a resource buffer adjustment. The determination as to whether the device metrics indicate a resource buffer adjustment may be made via other and/or additional methods without departing from embodiments disclosed herein.

In one or more embodiments disclosed herein, if it is determined that the device metrics indicate a resource buffer adjustment, then the method proceeds to Step 608. In one or more embodiments disclosed herein, if it is determined that the device metrics do not indicate a resource buffer adjustment, then the method proceeds to Step 612.

At Step 608, the resource buffer is updated based on the device metrics. If the minimum unallocated resources of the devices is less than the amount of unallocated resources specified by the resource buffer (e.g., the load of the application tasks is higher than expected), then the endpoint controller may increase the resource buffer to generate an updated resource buffer to handle the load spikes and higher loads of the application tasks executing on the device. If the minimum unallocated resources of the devices is more than the amount of unallocated resources specified by the resource buffer (e.g., the load of the application tasks is lower than expected), then the endpoint controller may decrease the resource buffer to generate an updated resource buffer to increase the amount allocable resources to execute additional application tasks. The resource buffer may be updated based on the device metrics via other and/or additional methods without departing from embodiments disclosed herein.

In one or more embodiments disclosed herein, the method ends following Step 608.

At Step 610, a determination is made as to whether a new initial resource buffer is obtained. In one or more embodiments disclosed herein, the global controller periodically generates new initial resource buffer which may replace previous initial resource buffers. The global controller may provide the new initial resource buffers to the endpoint controller as discussed above in Step 600. In one or more embodiments disclosed herein, if the endpoint controller receives an additional resource buffer from the local controller, then the endpoint controller determines that a new initial resource buffer is obtained. In one or more embodiments disclosed herein, if the endpoint controller does not receive an additional resource buffer from the local controller, then the endpoint controller determines that a new initial resource buffer is not obtained. The determination as to whether a new initial resource buffer is obtained may be made via other and/or additional methods without departing from embodiments disclosed herein.

In one or more embodiments disclosed herein, if it is determined that a new initial resource buffer is obtained, then the method proceeds to Step 610. In one or more embodiments disclosed herein, if it is determined that a new initial resource buffer is not obtained, then the method ends following Step 610.

At Step 612, the initial resource buffer is updated with the new initial resource buffer. In one or more embodiments disclosed herein, the endpoint controller implements the new initial resource buffer, and begins maintaining the new resource buffer instead of the initial resource buffer obtained in Step 600. As discussed above, the endpoint controller may implement scheduling assignments obtained from the local controller to instantiate application tasks on the device associated with the endpoint controller. While scheduling application tasks, the endpoint controller may maintain the new initial resource buffer. In other words, the endpoint controller may allocate resources of the device to execute the application tasks so that the amount of unallocated resources never drops below the new initial resource buffer. If implementing the scheduling assignments results in the amount of unallocated resources dropping below the new initial resource buffer, then the endpoint controller may not implement the scheduling assignments and may notify the local controller to reschedule the application tasks included in the scheduling assignments to a different device. The initial resource buffer may be updated with the new initial resource buffer via other and/or additional methods without departing from embodiments disclosed herein.

In one or more embodiments disclosed herein, the method proceeds to Step 602 following Step 612.

Third Example

The following section describes a third example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in these particular examples. The example is intended to include simple examples to illustrate, at least in part, concepts described herein.

Consider a scenario in which an endpoint controller performs resource buffer management for a device of an MCIE domain. At a first point in time, the endpoint controller obtains an initial resource buffer from an associated local controller. The initial resource buffer is generated by the global controller. After obtaining the initial resource buffer, the endpoint controller maintains the initial resource buffer during application task provisioning. At some later point in time, the endpoint controller obtains a scheduling assignment that includes two application tasks. The endpoint controller determines that the resources required to execute the application tasks will not result in less unallocated resources than that specified by the resource buffer. In response to the determination, the endpoint controller instantiates the two application tasks and executes them.

During execution, monitoring services executing on the device collect device metrics associated with the two application tasks. The device metrics indicate that the percentage of unallocated resources is significantly more than that which is required by the resource buffer, with no load spikes consuming more resources than expected. As a result, the endpoint controller determines that the device metrics indicate that the resource buffer is to be decreased so that additional application tasks may be allocated to the device.

At a later point in time, the endpoint controller obtains a scheduling assignment that includes an additional application task. The endpoint controller determines that the resources required to execute the application tasks in combination with the two previously provisioned application tasks will not result in less unallocated resources than that specified by the resource buffer. In response to the determination, the endpoint controller instantiates the additional application tasks and execute it. As a result, three application tasks are executing on the device.

During execution, monitoring services executing on the device collect device metrics associated with the three application tasks. The device metrics indicate that the percentage of unallocated resources is significantly less than that which is required by the resource buffer, with load spikes consuming more resources than expected. As a result, the endpoint controller determines that the device metrics indicate that the resource buffer is to be increased so that no additional application tasks may be allocated to the device so that the device may handle any potential load spikes and the higher-than-expected load associated with the three application tasks.

End of Third Example

Figure 7:
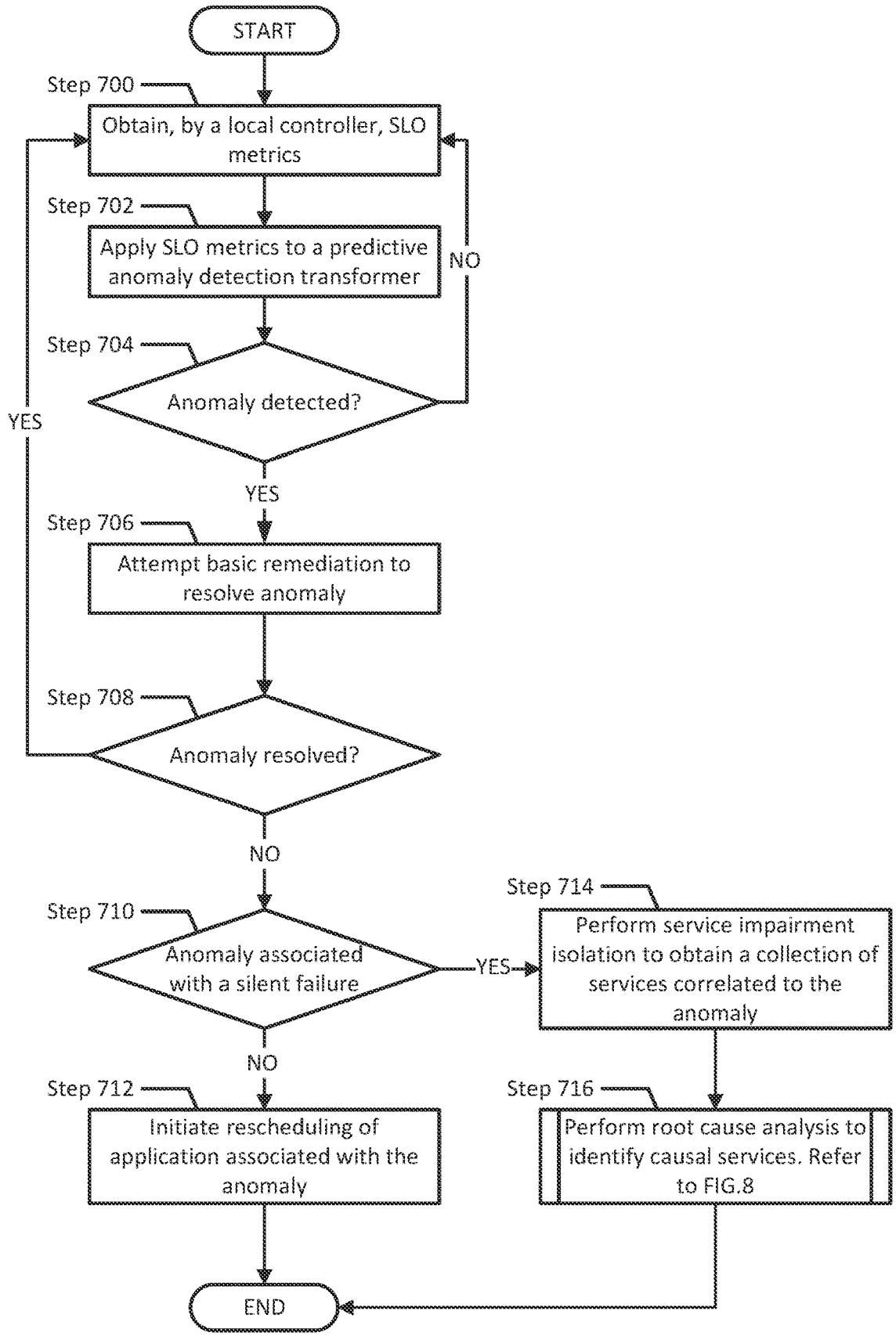
FIG. 7 shows a flowchart of a method for predicting anomalies within an MCIE environment in accordance with one or more embodiments disclosed herein.

FIG. 7 shows a flowchart of a method for predicting anomalies within an MCIE environment in accordance with one or more embodiments disclosed herein. The method of FIG. 7 may be performed by, for example, a local controller (e.g., 112A, FIG. 1A). Other components illustrated in FIG. 1A may perform all, or a portion, of the steps shown in FIG. 7 without departing from embodiments disclosed herein. While the various steps in the flowchart shown in FIG. 7 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

At Step 700, SLO metrics are obtained by a local controller. In one or more embodiments disclosed herein, the endpoint controllers (or cloud native control planes) generate SLO metrics associated with applications executing in the MCIE environment. The endpoint controllers may store the SLO metrics in a storage location that is accessible by the local controller (e.g., a distributed storage system, peer-to-peer file system, network file system, etc.) which the local controller may use to obtain the SLO metrics. In other embodiments disclosed herein, the endpoint controllers may periodically provide or continuously stream the SLO metrics to the local controller, which may store the SLO metrics in one or more storage devices associated with the local controller. In still other embodiments disclosed herein, the local controller may send requests for SLO metrics to the endpoint controllers, and the endpoint controllers may provide the SLO metrics to the local controller in response to obtaining the requests. SLO metrics may be obtained by the local controller via other and/or additional methods without departing from embodiments disclosed herein.

In one or more embodiments disclosed herein, SLO metrics refer to one or more data structures that includes SLO information associated with the applications executing on the devices of the MCIE domain associated with the local controller. The SLO information may include application request latencies (e.g., the time it takes for an application to service a request), application performance (e.g., the count of successful responses divided by the total count of responses for an application), and/or availability (e.g., the percentage of time over a configurable period of time in which an application is operational). The SLO metrics may include other and/or additional types of information associated with applications without departing from embodiments disclosed herein.

At Step 702, the SLO metrics are applied to a predictive anomaly detection transformer. The predictive anomaly detection transformer may refer to an artificial intelligence algorithm that generates application fingerprints using SLO metrics, and monitors the application fingerprints to identify and/or predict anomalies associated with applications. The predictive anomaly detection transformer may be implemented using any combination of artificial intelligence and/ or machine learning algorithms without departing from embodiments disclosed herein. The predictive anomaly detection transformer may use, for example, two branches of temporal data point association, prior association and time series association, to calculate the distribution of an SLO metric and its relations with other SLO metrics and series of SLO metrics. The predictive anomaly detection transformer may use prior association and time series association to generate two distributions of SLO metrics. The predictive anomaly detection transformer may look for divergence in the two distribution of SLO metrics using any appropriate divergence identification technique without departing from embodiments disclosed herein. The predictive anomaly detection transformer may use other and/or additional anomaly detection techniques or methods without departing from embodiments disclosed herein. Anomalies may be identified as SLO metrics or series of SLO metrics which are associated with high divergence (e.g., SLO metric outliers compared to SLO metrics associated with normal application performance). The SLO metrics may be applied to a predictive anomaly detection transformer via other and/or additional methods without departing from embodiments disclosed herein.

At Step 704, a determination is made as to whether an anomaly is detected. In one or more embodiments disclosed herein, the predictive anomaly detection transformer generates application fingerprints using SLO metrics and monitors application fingerprints using methods discussed above in Step 702 to identify anomalies. In order to avoid false positives, an anomaly is detected or predicted when a configurable amount of anomalous periods of SLO metrics associated with an application is exceeded within a configurable time period. In one or more embodiments disclosed herein, if the predictive anomaly detection transformer identifies a quantity of anomalous periods of SLO metrics associated with an application that exceeds the configurable amount of anomalous periods within the configurable time period, then the local controller determines that an anomaly is detected. In one or more embodiments disclosed herein, if the predictive anomaly detection transformer does not identify a quantity of anomalous periods of SLO metrics associated with an application that exceeds the configurable amount of anomalous periods within the configurable time period, then the local controller determines that an anomaly is not detected. The determination as to whether an anomaly is detected may be made via other and/or additional methods without departing from embodiments disclosed herein.

In one or more embodiments disclosed herein, if it is determined that an anomaly is detected, then the method proceeds to Step 706. In one or more embodiments disclosed herein, if it is determined that an anomaly is not detected, then the method proceeds to Step 700.

At Step 706, basic remediation is attempted to resolve the anomaly. In one or more embodiments disclosed herein, the local controller initiates the performance of basic remediation by the endpoint controller (or the cloud native control plane) to resolve the anomaly. Basic remediation may include any quantity of basic remediation actions. Such basic remediation actions may include, but may not be limited to, restarting application execution, restarting device executing application, etc. Basic remediation may be attempted to resolve the anomaly via other and/or additional methods without departing from embodiments disclosed herein.

At Step 708, a determination is made as to whether the anomaly was resolved. The endpoint controller (or cloud native controller plane) may perform the basic remediation and collect new SLO metrics associated with the application corresponding to the anomaly following the basic remediation for a configurable amount of time. The endpoint controller may provide the new SLO metrics to the local controller. The local controller may compare the new SLO metrics with the SLO metrics associated with the anomaly to determine whether the anomaly was resolved. In one or more embodiments of the invention, if the new SLO metrics are better than the SLO metrics associated with the anomaly (e.g., faster response latency, higher performance, higher availability, etc.), then the local controller determines that the anomaly is resolved. In one or more embodiments of the invention, if the new SLO metrics are not better than the SLO metrics associated with the anomaly, then the local controller determines that the anomaly is not resolved.

In other embodiments disclosed herein, the local controller may apply the new metrics to the predictive anomaly detection transformer as discussed above in Step 702 and Step 704. In one or more embodiments disclosed herein, if the predictive anomaly detection transformer identifies an anomaly using the new SLO metrics, then the local controller determines that the anomaly is not resolved. In one or more embodiments disclosed herein, if the predictive anomaly detection transformer does not identify an anomaly using the new SLO metrics, then the local controller determines that the anomaly is resolved.

The determination as to whether the anomaly was resolved may be made via other and/or additional methods without departing from embodiments disclosed herein.

In one or more embodiments disclosed herein, if it is determined that the anomaly is resolved, then the method proceeds to Step 700. In one or more embodiments disclosed herein, if it is determined that the anomaly is not resolved, then the method proceeds to Step 708.

At Step 710, a determination is made as to whether the anomaly is associated with a silent failure. In one or more embodiments disclosed herein, the local controller determines whether the anomaly is associated with a silent failure using device metrics associated with one or more devices executing the application. In one or more embodiments disclosed herein, a silent failure may refer to anomalous application behavior when all devices, or portions thereof, executing the application appear to be functioning properly. The device metrics may be one or more data structures that include information that may indicate whether devices are available and/or functioning properly. The device metrics may include availability statuses, resource utilization, etc. The device metrics may include other and/or additional information associated with the health of devices without departing from embodiments disclosed herein. In one or more embodiments disclosed herein, if it is determined that the device metrics indicate that a device associated with the anomaly is unavailable or has failed for any reason, then the local controller determines that the anomaly is not associated with a silent failure. In one or more embodiments disclosed herein, if it is determined that the device metrics indicate that the devices associated with the anomaly are available and healthy, then the local controller determines that the anomaly is associated with a silent failure. The determination as to whether the anomaly is associated with a silent failure may be made via other and/or additional methods without departing from embodiments disclosed herein.

In one or more embodiments disclosed herein, if it is determined that the anomaly is associated with a silent failure, then the method proceeds to Step 714. In one or more embodiments disclosed herein, if it is determined that the anomaly is not silent failure, then the method proceeds to Step 712.

At Step 712, rescheduling of the application associated with the anomaly is initiated. In one or more embodiments disclosed herein, the local controller sends a request to the global controller to reschedule the application associated with the anomaly. Rescheduling of the application associated with the anomaly may be initiated via other and/or additional methods without departing from embodiments disclosed herein.

At Step 714, service impairment isolation is performed to obtain a collection of services correlated to the anomaly. In one or more embodiments disclosed herein, the local controller performs service impairment isolation using a deep recurring Q network (DPQN) algorithm, a random forest variance classification (RFVC) algorithm, and a Pearson correlation coefficient (PCC) algorithm. Other and/or additional algorithms may be used to perform service impairment isolation without departing from embodiments disclosed herein. The local controller may also use the service dependency graph and the SLO metrics associated with three different time periods of the application corresponding to the anomaly to perform service impairment isolation. The local controller may use other and/or additional information associated with the application corresponding with the anomaly to perform service impairment isolation without departing from embodiments disclosed herein. The three time periods include normal operation (e.g., prior to anomaly detection), abnormal operation (e.g., during the time period in which the anomaly was detected), and the tracing period (e.g., after the anomaly was detected).

The DPQN algorithm may be applied to the service dependency graph to identify the critical path of services associated with the application for each aforementioned time period. The RFVC algorithm and the critical path may be used to generate a rank order of correlated services associated with the anomaly. The PCC algorithm may be used to calculate the zero order coefficient (ZOC) for each service compared to the overall application using the SLO metrics. The local controller may rank the services based on the ZOC. The RFVC and ZOC ranked orders may be combined using a configurable weighting associated with each ranked order to create ranked ordered lists of correlated service variance to application variance. The top three services of the ranked order of correlated service variance to application variance may be identified as the collection of correlated services associated with the anomaly.

Service impairment isolation may be performed to obtain a collection of services correlated to the anomaly via other and/or additional methods without departing from embodiments disclosed herein.

At Step 716, root cause analysis is performed to identify causal services. For additional information regarding the performance of root cause analysis, refer to FIG. 8.

In one or more embodiments disclosed herein, the method ends following Step 716.

Fourth Example

The following section describes a fourth example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in these particular examples. The example is intended to include simple examples to illustrate, at least in part, concepts described herein.

Consider a scenario in which a local controller performs anomaly detection for an MCIE domain. At a first point in time, the local controller SLO metrics associated with applications executing on devices of the MCIE domain. The local controller applies these SLO metrics to the predictive anomaly detection transformer. The predictive anomaly detection transformer generates fingerprints associated with the application and uses the fingerprints to monitor for anomalies. The local controller continues to obtain additional SLO metrics, which are in turn applied to the predictive anomaly detection transformer, which in turn generates new application fingerprints. The predictive anomaly detection transformer is configured to identify an anomaly when three anomalous periods are identified within a thirty minute. During the fourth thirty minute time period, the predictive anomaly detection transformer identifies an anomaly associated with an application executing within a device of the MCIE domain.

In response to detecting the anomaly, the local controller sends a message to the endpoint controller associated with the device that executes the application. The message includes a request to perform basic remediation. In response to obtaining the request, the endpoint controller performs basic remediation. The basic remediation includes restarting the device. After performing basic remediation, the endpoint controller obtains new SLO metrics, and provides the new SLO metrics to the local controller. The local controller compares the new SLO metrics with the SLO metrics associated with the anomaly and identifies that the new SLO metrics have not changed since the performance of basic remediation. The local controller then determines that the anomaly is not resolved.

In response to the determination, the local controller obtains device metrics associated with the device that executes the application. The device metrics indicate that the device is available and healthy. The local controller then determines that the anomaly is associated with a silent failure. In response to the determination, the local controller identifies three services of the ten total services associated with the application are the most correlated services to the anomaly. The local controller then uses the correlated services to perform root cause analysis.

End of Fourth Example

Figure 8:
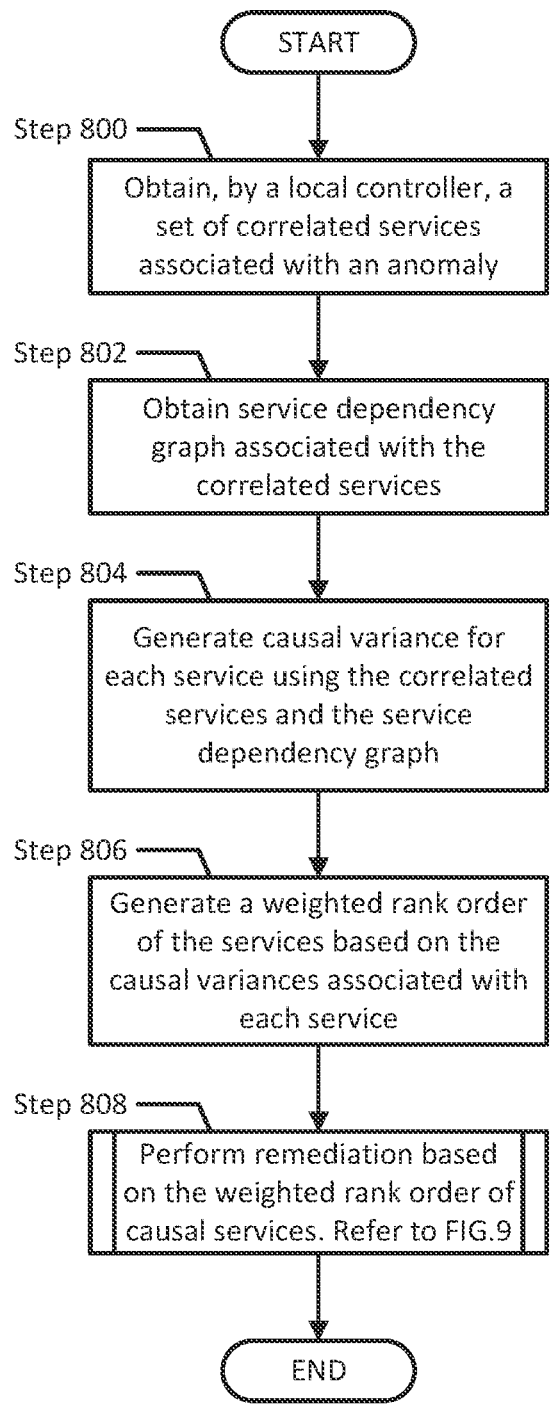
FIG. 8 shows a flowchart of a method for performing root cause analysis associated with service impairments in accordance with one or more embodiments disclosed herein.

FIG. 8 shows a flowchart of a method for performing root cause analysis associated with service impairments in accordance with one or more embodiments disclosed herein. The method of FIG. 8 may be performed by, for example, a local controller (e.g., 112A, FIG. 1A). Other components illustrated in FIG. 1A may perform all, or a portion, of the steps shown in FIG. 8 without departing from embodiments disclosed herein. While the various steps in the flowchart shown in FIG. 8 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

At Step 800, a local controller obtains a set of correlated services associated with an anomaly. Refer to Step 714 of FIG. 7 for additional information regarding obtaining a set of correlated services correlated to an anomaly.

At Step 802, a service dependency graph associated with the correlated services is obtained. In one or more embodiments disclosed herein, the graph database maintained by the local controller includes a service dependency graph associated with each application, or portion thereof, which is executing in the domain. The local controller may obtain the service dependency graph from the graph database using the application identifier associated with the application corresponding with the anomaly. The service dependency graph associated with the set of services correlated to the anomaly may be obtained via other and/or additional methods without departing from embodiments disclosed herein.

At Step 804, causal variance is generated for each service using the correlated services and the service dependency graph. In one or more embodiments disclosed herein, the local controller applies the service dependency graph, the set of correlated services, and a list of the services associated with the application corresponding to the anomaly to a causal service engine to generate the causal variance for each service. The causal symbolic engine may refer to one or more algorithms that generate causal variance calculation. The causal symbolic engine may include, for example, a process calculus algorithm for generating causal variances associated with each service in the service dependency graph associated with an application. Causal variance may refer to a value indicating the likelihood that a service is the root cause of the anomaly associated with the service. Causal variance may be generated for each service using the correlated services and the service dependency graph via other and/or additional methods without departing from embodiments disclosed herein.

At Step 806, a weighted rank order of the services is generated based on the causal variances associated with each service. In one or more embodiments disclosed herein, the local controller ranks the services in descending causal variance order. As a result, the service associated with the highest causal variance may be in the first position and the service associated with the lowest causal variance may be in the last position. The weighted rank order of the service may be generated based on the causal variances associated with each service via other and/or additional methods without departing from embodiments disclosed herein.

At Step 808, remediation is performed based on the weighted rank order of the causal services. For additional information regarding the performance of remediation based on the weighted rank order of causal services, refer to FIG. 9.

In one or more embodiments disclosed herein, the method ends following Step 808.

Fifth Example

The following section describes a fifth example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in these particular examples. The example is intended to include simple examples to illustrate, at least in part, concepts described herein.

Consider a scenario in which a local controller performs root cause analysis associated with an anomaly. Continuing with the discussion of the Fourth Example, the local controller has identified an anomaly associated with an application with ten services. Three of those services have been identified as services that are highly correlated to the anomaly. The local controller then obtains a service dependency graph associated with the application. The service dependency graph specifies the ten services of the application and a hierarchical relationship of dependencies between the services. The local controller then applies a causal service engine to the service dependency graph, the three services which are highly correlates with the anomaly, and the total list of services to generate causal variances associated with each of the ten services. The causal variances specify probabilities that each service is a cause of the anomaly.

The local controller then ranks the services in descending order based on the causal variance associated with each service. The top three causal services include two of the three services which were highly correlated to the anomaly and another of the ten services of the application. The local controller than performs service impairment remediation using the top three causal services.

End of Fifth Example

Figure 9:
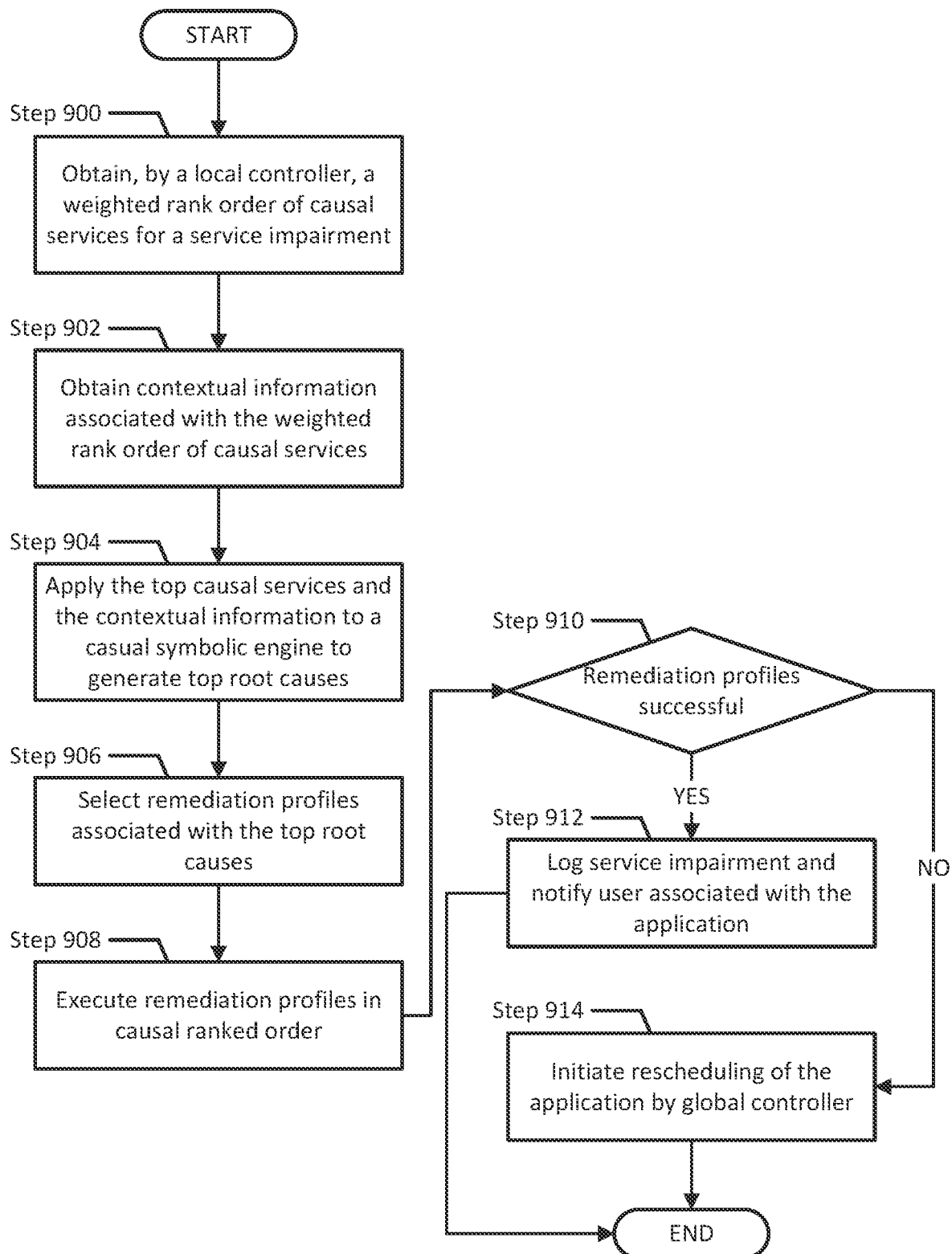
FIG. 9 shows a flowchart of a method for performing remediation of service impairments in accordance with one or more embodiments disclosed herein.

FIG. 9 shows a flowchart of a method for performing remediation of service impairments in accordance with one or more embodiments disclosed herein. The method of FIG. 9 may be performed by, for example, a local controller (e.g., 112A, FIG. 1A). Other components illustrated in FIG. 1A may perform all, or a portion, of the steps shown in FIG. 9 without departing from embodiments disclosed herein. While the various steps in the flowchart shown in FIG. 9 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

At Step 900, a weighted rank order of causal services for a service impairment is obtained. For additional information regarding obtaining a weighted ran order of causal services for a service impairment, refer to FIG. 8.

At Step 902, contextual information associated with the weighted rank order of causal services is obtained. The local controller may obtain contextual information associated with the weighted rank order of causal services from the graph database and/or from endpoint controller associated with the services included in the weighted rank order of causal services. The contextual information may refer to one or more data structures that include SLO metrics, device types, domain types, service types, and device metrics associated with each service. The contextual information may include other and/or additional information associated with the services included in the weighted rank order of causal services without departing from embodiments disclosed herein. Contextual information associated with the weighted rank order of causal services may be obtained via other and/or additional methods without departing from embodiments disclosed herein.

At Step 904, the top causal services and the contextual information are applied to a causal symbolic engine to generate top root causes. The local controller may apply the causal symbolic engine to a configurable number of top services included in the weighted rank order of causal services and the contextual information associated with each top service. The causal symbolic engine may be an embodiment of the causal symbolic engine discussed above in Step 804 of FIG. 8. The causal symbolic engine may execute, for example, a process calculus algorithm and a causal identifiability theorem using the top causal services and the contextual information to generate a probability associated with the top root causes. A root cause may include, but may not be limited to, resource exhaustion, shared resource contention, shared resource failure, application contention, security constraint, network impairment, potential service defect or misconfiguration, etc. The causal symbolic engine may also generate remediation parameters associated with each top root cause. The remediation parameters may specify a magnitude or numerical quality associated with remediation each of the top root causes. Each remediation parameter may be associated with a remediation profile and/or include a remediation parameter type that may be used to select associated remediation profiles. For example, a remediation parameter may specify a number of resources to vertically scale up. The top causal services and the contextual information may be applied to the causal symbolic engine to generate top root causes via other and/or additional methods without departing from embodiments disclosed herein.

At Step 906, remediation profiles associated with the top root causes are selected. In one or more embodiments disclosed herein, the local controller selects the remediation profiles based on the top root causes and the remediation parameters. Each top root cause (e.g., the top three root causes) and/or remediation parameter may be associated with a remediation profile. The remediation profiles may include root cause identifiers associated with one or more top root causes. The remediation profiles may also include remediation parameter types associated with remediation parameters corresponding with the top root causes. A remediation profile may include one or more actions that may be performed to remediate the anomaly (e.g., the impaired service). The remediation profiles may include, for example, increasing resource capacity, replicating services, migrating services, evicting lower priority services, rescheduling the application. Remediation profiles associated with other and/or additional actions that may be performed to remediate an impaired service or an anomaly associated with an anomaly without departing from embodiments disclosed herein. The local controller may select remediation profiles associated with the top root causes via other and/or additional methods without departing from embodiments disclosed herein.

At Step 908, the remediation profiles are executed in causal ranked order. In one or more embodiments disclosed herein, the local controller initiates the performance of the remediation profiles by sending the remediation profiles associated with the top root causes in ranked order to the endpoint controller (or the cloud native control plane). In response to receiving remediation profiles the endpoint controller (or the cloud native control plane) execute the remediation profiles in ranked order, with the remediation profile associated with the first top root cause executed first and the remediation profile associated with the second top root cause executed second, and so on. The remediation profiles may be executed in causal ranked order via other and/or additional methods without departing from embodiments disclosed herein.

At Step 910, a determination is made as to whether the remediation profiles were successful. The endpoint controller (or cloud native controller plane) may perform the remediation profiles and collect new SLO metrics associated with the application corresponding to the anomaly following the performance of the remediation profiles for a configurable amount of time. The endpoint controller may provide the new SLO metrics to the local controller. The local controller may compare the new SLO metrics with the SLO metrics associated with the anomaly to determine whether the anomaly (e.g., impaired service) was resolved. In one or more embodiments of the invention, if the new SLO metrics are better than the SLO metrics associated with the anomaly (e.g., faster response latency, higher performance, higher availability, etc.), then the local controller determines that the remediation profiles were resolved. In one or more embodiments of the invention, if the new SLO metrics are not better than the SLO metrics associated with the anomaly, then the local controller determines that the remediation profiles are not resolved.

In other embodiments disclosed herein, the local controller may apply the new metrics to the predictive anomaly detection transformer as discussed above in Step 702 and Step 704. In one or more embodiments disclosed herein, if the predictive anomaly detection transformer identifies an anomaly using the new SLO metrics, then the local controller determines that the remediation profiles were not successful. In one or more embodiments disclosed herein, if the predictive anomaly detection transformer does not identify an anomaly using the new SLO metrics, then the local controller determines that the remediation profiles were successful.

The local controller may perform Step 910 after each remediation profile is performed or after all remediation profiles are performed without departing from embodiments disclosed herein.

In one or more embodiments disclosed herein, if it is determined that the remediation profiles were successful, then the method proceeds to Step 912. In one or more embodiments disclosed herein, if it is determined that the remediation profiles were not successful, then the method proceeds to Step 914.

At Step 912, service impairment information is logged and the user associated with the application is notified. In one or more embodiments of the invention, the local controller generates a service impairment log. The service impairment log may refer to one or more data structures that include service impairment information associated with the anomaly or impaired service. The service impairment information may include, for example, the application identifier, one or more service identifiers associated with the top causal services, one or more root cause identifiers associated with top root causes, one or more remediation profile identifiers used to resolve the anomaly or service impairment, the domain identifier and/or device identifiers associated with the anomaly or service impairment, an anomaly detection timestamp, and/or a resolution timestamp. The service impairment information may include other and/or additional information associated with resolved anomaly or service impairment. The local controller may store the service impairment log and include a copy of the service impairment log in a notification that is sent to the global controller, which in turn sends the notification to the user associated with the application that included the service impairment or anomaly. Service impairment information may be logged and the user associated with the application may be notified via other and/or additional methods without departing from embodiments disclosed herein.

In one or more embodiments disclosed herein, the method ends following Step 912.

At Step 914, rescheduling of the application by the global controller is initiated. In one or more embodiments disclosed herein, the local controller sends a request to the global controller to reschedule the application associated with the anomaly. Rescheduling of the application associated with the anomaly may be initiated via other and/or additional methods without departing from embodiments disclosed herein.

In one or more embodiments disclosed herein, the method ends following Step 914.

Sixth Example

The following section describes a sixth example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in these particular examples. The example is intended to include simple examples to illustrate, at least in part, concepts described herein.

Consider a scenario in which a local controller performs remediation for a service impairment. Continuing with the discussion of the Fifth Example, the top three causal services with a detected anomaly in the performance of an application have been identified (e.g., the three services most likely to be the cause anomaly). The application includes ten total services which all execute on a device of the MCIE domain associated with the local controller.

At a first point in time, the local controller obtains contextual information from a graph database and the endpoint controller associated with the device that executes the application services. The contextual information includes the application type, the service types associated with each of the services, and device metrics associate with each of the services. The local controller then applies the causal engine to the top three causal services and the contextual information to generate three top root causes associated with each top causal service and the corresponding contextual information. The three top root causes include in weighted causal order are resource exhaustion, resource contention, and application contention. The causal engine also generates two remediation parameters associated with the top root causes. The remediation parameters include three additional services for horizontal scaling and quantity of two services to evict. Based on the top root causes and the remediation parameters generated by the causal symbolic engine, the local controller selects three remediation plans.

The first remediation plan includes horizontal scaling of the top causal service by the remediation parameter. The second remediation plan includes migrating the second top causal service to a different device. Finally, the third remediation plan associated with the third top causal service include evicting low priority services based on the remediation parameter. After selecting the remediation profiles, the local controller initiates the execution of the remediation profiles in top causal order (e.g., the first remediation plan executed first, the second remediation plan executed second, and the third remediation plan third) by sending the remediation plans to the endpoint controller. The local controller may perform the service migration specified by the second remediation profile and notify the endpoint controller of the results. The endpoint controller then performs the remediation plans.

After the remediation plans are performed the local controller obtains new SLO metrics based on the application performance following the execution of the remediation plans. The local controller compares the new SLO metrics with the SLO metrics associated with the anomaly and determines that the new SLO metrics indicates that the remediation plans were successful. The local controller then service impairment log information and notifies the user associated with the application.

End of Sixth Example

Figure 10:
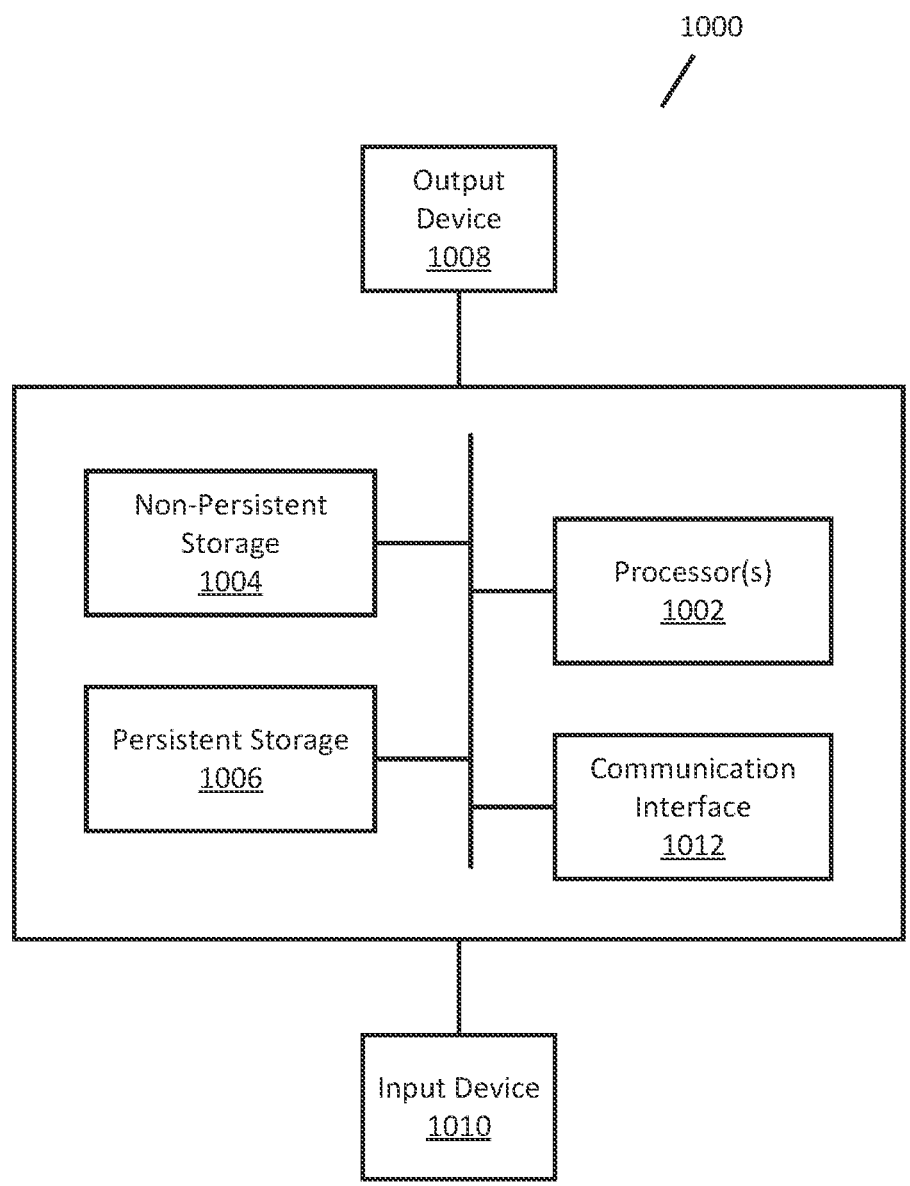
FIG. 10 shows a diagram of a computing device in accordance with one or more embodiments disclosed herein.

As discussed above, embodiments disclosed herein may be implemented using computing devices. FIG. 10 shows a diagram of a computing device in accordance with one or more embodiments disclosed herein. The computing device (1000) may include one or more computer processors (1002), non-persistent storage (1004) (e.g., volatile memory, such as random access memory (RAM), cache memory), persistent storage (1006) (e.g., a hard disk, an optical drive such as a compact disc (CD) drive or digital versatile disc (DVD) drive, a flash memory, etc.), a communication interface (1012) (e.g., Bluetooth® interface, infrared interface, network interface, optical interface, etc.), input devices (1010), output devices (1008), and numerous other elements (not shown) and functionalities. Each of these components is described below.

In one embodiment disclosed herein, the computer processor(s) (1002) may be an integrated circuit for processing instructions. For example, the computer processor(s) may be one or more cores or micro-cores of a processor. The computing device (1000) may also include one or more input devices (1010), such as a touchscreen, keyboard, mouse, microphone, touchpad, electronic pen, or any other type of input device. Further, the communication interface (1012) may include an integrated circuit for connecting the computing device (1000) to a network (not shown) (e.g., a local area network (LAN), a wide area network (WAN) such as the Internet, mobile network, or any other type of network) and/or to another device, such as another computing device.

In one embodiment disclosed herein, the computing device (1000) may include one or more output devices (1008), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1002), non-persistent storage (1004), and persistent storage (1006). Many different types of computing devices exist, and the aforementioned input and output device(s) may take other forms.

Embodiments described herein relate to local controllers monitoring application SLO metrics and detecting and/or predicting anomalies associated with performances of applications within MCIE domains. In one or more embodiments, in response to identifying anomalies, the local controllers may identify correlated, and then causal services associated with the anomalies during the performance of root cause analysis. Additionally, the local controllers may perform remediation of service impairments and anomalies using the correlated services. Accordingly, the negative effects of service failure in the distributed multi-tiered computing environment may be mitigated and the performance of applications may be improved, which may increase the likelihood of meeting the SLAs and SLOs for the applications.

The problems discussed above should be understood as being examples of problems solved by embodiments disclosed herein, and embodiments disclosed herein should not be limited to solving the same/similar problems. The embodiments disclosed herein are broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for performing domain level management m a distributed multi-tiered computing (DMC) environment, comprising:
    obtaining, by a local controller associated with a DMC domain, a set of correlated services associated with an anomaly;
    generating, by the local controller, a service dependency graph associated with the set of correlated services using a graph database and the set of correlated services;
    executing, by the local controller, a causal symbolic engine using the correlated services, the service dependency graph, and a set of services associated with an application corresponding to the anomaly to generate a causal variance for each service;
    generating, by the local controller, a weighted rank order of causal services based on the causal variance associated with each service, wherein:
        the weighted rank order of causal services comprises a portion of the services associated with an application associated with the anomaly, and
        the weighted rank order of causal services comprises at least one service outside the set of correlated services; and
    performing, by the local controller, remediation based on the weighted rank order of the causal services.

2. The method of claim 1, wherein the weighted rank order of causal services specifies a descending order of services based on the causal variance associated with each service, wherein the service associated with the highest causal variance is associated with a top position and the service associated with the lowest causal variance is associated with a bottom position of the weighted rank order of causal services.

3. The method of claim 1, wherein the causal symbolic engine uses process calculus association to generate the causal variances.

4. The method of claim 1, wherein the DMC domain comprises one selected from a group consisting of:
    an edge domain;
    a core domain; and
    a cloud domain.

5. The method of claim 4, wherein:
    the edge domain comprises an edge domain device set;
    the core domain comprises a core domain device set; and
    the cloud domain comprises a cloud domain device set.

6. A non-transitory computer readable medium comprising computer readable program code, which when executed by a computer processor enables the computer processor to perform a method for managing a distributed multi-tiered computing (DMC) environment, comprising:
    obtaining, by a local controller associated with a DMC domain, a set of correlated services associated with an anomaly;
    generating, by the local controller, a service dependency graph associated with the set of correlated services using a graph database and the set of correlated services;
    executing, by the local controller, a causal symbolic engine using the correlated services, the service dependency graph, and a set of services associated with an application corresponding to the anomaly to generate a causal variance for each service;
    generating, by the local controller, a weighted rank order of causal services based on the causal variance associated with each service, wherein:
        the weighted rank order of causal services comprises a portion of the services associated with an application associated with the anomaly, and
        the weighted rank order of causal services comprises at least one service outside the set of correlated services; and
    performing, by the local controller, remediation based on the weighted rank order of the causal services.

7. The non-transitory computer readable medium of claim 6, wherein the weighted rank order of causal services specifies a descending order of services based on the causal variance associated with each service, wherein the service associated with the highest causal variance is associated with a top position and the service associated with the lowest causal variance is associated with a bottom position of the weighted rank order of causal services.

8. The non-transitory computer readable medium of claim 6, wherein the causal symbolic engine uses process calculus association to generate the causal variances.

9. The non-transitory computer readable medium of claim 6, wherein the DMC domain comprises one selected from a group consisting of:
    an edge domain;
    a core domain; and
    a cloud domain.

10. The non-transitory computer readable medium of claim 9, wherein:
    the edge domain comprises an edge domain device set;
    the core domain comprises a core domain device set; and
    the cloud domain comprises a cloud domain device set.

11. A system for managing a distributed multi-tiered computing (DMC) environment, the system comprising:
    a DMC environment; and
    a local controller associated with a DMC domain of the DMC environment, comprising a processor and memory, and configured to:
        obtain a set of correlated services associated with an anomaly;
        generate a service dependency graph associated with the set of correlated services using a graph database and the set of correlated services;
        execute, by the local controller, a causal symbolic engine using the correlated services, the service dependency graph, and a set of services associated with an application corresponding to the anomaly to generate a causal variance for each service;
        generate a weighted rank order of causal services based on the causal variance associated with each service, wherein:
            the weighted rank order of causal services comprises a portion of the services associated with an application associated with the anomaly, and
            the weighted rank order of causal services comprises at least one service outside the set of correlated services; and perform remediation based on the weighted rank order of the causal services.

12. The system of claim 11, wherein the weighted rank order of causal services specifies a descending order of services based on the causal variance associated with each service, wherein the service associated with the highest causal variance is associated with a top position and the service associated with the lowest causal variance is associated with a bottom position of the weighted rank order of causal services.

13. The system of claim 11, wherein the causal symbolic engine uses process calculus association to generate the causal variances.

14. The system of claim 11, wherein the DMC domain comprises one selected from a group consisting of:
   an edge domain;
   a core domain; and
   a cloud domain.

* * * * *